(12) United States Patent
Pease et al.

(10) Patent No.: US 12,198,280 B2
(45) Date of Patent: Jan. 14, 2025

(54) DISPLAYING A VIRTUAL DISPLAY

(71) Applicant: Apple Inc., Cupertino, CA (US)

(72) Inventors: Timothy R. Pease, Emerald Hills, CA (US); Alexandre Da Veiga, San Francisco, CA (US); David H. Huang, San Mateo, CA (US); Peng Liu, San Jose, CA (US); Robert K. Molholm, Scotts Valley, CA (US)

(73) Assignee: Apple Inc., Cupertino, CA (US)

(*) Notice: Subject to any disclaimer, the term of this patent is extended or adjusted under 35 U.S.C. 154(b) by 62 days.

(21) Appl. No.: 18/068,711

(22) Filed: Dec. 20, 2022

(65) Prior Publication Data

US 2023/0298281 A1  Sep. 21, 2023

Related U.S. Application Data

(63) Continuation of application No. PCT/US2021/037683, filed on Jun. 16, 2021.

(60) Provisional application No. 63/146,453, filed on Feb. 5, 2021, provisional application No. 63/042,322, filed on Jun. 22, 2020.

(51) Int. Cl.
| | |
|---|---|
| *G06T 19/00* | (2011.01) |
| *G06F 3/01* | (2006.01) |
| *G06F 3/14* | (2006.01) |
| *G06F 3/16* | (2006.01) |
| *G06V 40/20* | (2022.01) |

(52) U.S. Cl.
CPC ............ *G06T 19/006* (2013.01); *G06F 3/013* (2013.01); *G06F 3/14* (2013.01); *G06F 3/165* (2013.01); *G06V 40/20* (2022.01)

(58) Field of Classification Search
CPC ......... G06T 19/006; G06F 3/013; G06F 3/14; G06F 3/165; G06F 3/011; G06V 40/20
See application file for complete search history.

(56) References Cited

U.S. PATENT DOCUMENTS

| | | |
|---|---|---|
| 8,866,849 B1 | 10/2014 | Cho et al. |
| 8,994,721 B2 | 3/2015 | Matsuda |
| 9,411,412 B1 | 8/2016 | Jain et al. |
| 9,459,692 B1 | 10/2016 | Li |

(Continued)

FOREIGN PATENT DOCUMENTS

| | | |
|---|---|---|
| CN | 102473068 A | 5/2012 |
| CN | 103765366 A | 4/2014 |

(Continued)

OTHER PUBLICATIONS

Applicant-Initiated Interview Summary received for U.S. Appl. No. 17/845,863, mailed on May 31, 2023, 3 pages.

(Continued)

*Primary Examiner* — Sultana M Zalalee
(74) *Attorney, Agent, or Firm* — DLA Piper LLP (US)

(57) ABSTRACT

In an exemplary process, a set of parameters corresponding to characteristics of a physical setting of a user is obtained. Based on the parameters, at least one display placement value and a fixed boundary location corresponding to the physical setting are obtained. In accordance with a determination that the at least one display placement value satisfies a display placement criterion, a virtual display is displayed at the fixed boundary location corresponding to the physical setting.

27 Claims, 14 Drawing Sheets

(56) References Cited

U.S. PATENT DOCUMENTS

| | | | |
|---|---|---|---|
| 9,665,249 | B1 | 5/2017 | Ding et al. |
| 9,696,549 | B2 | 7/2017 | Bean et al. |
| 9,880,729 | B2 | 1/2018 | Rakshit |
| 10,204,592 | B1 | 2/2019 | Trim et al. |
| 10,270,983 | B1 | 4/2019 | Van Os et al. |
| 10,403,043 | B2 | 9/2019 | Kaufman et al. |
| 11,366,514 | B2 | 6/2022 | Burns |
| 2001/0044858 | A1 | 11/2001 | Rekimoto |
| 2005/0245302 | A1 | 11/2005 | Bathiche et al. |
| 2012/0124509 | A1 | 5/2012 | Matsuda et al. |
| 2012/0249741 | A1 | 10/2012 | Maciocci et al. |
| 2013/0007672 | A1 | 1/2013 | Taubman |
| 2014/0047392 | A1 | 2/2014 | Kim et al. |
| 2014/0132629 | A1* | 5/2014 | Pandey ............... G06T 11/001 345/633 |
| 2014/0225919 | A1 | 8/2014 | Kaino et al. |
| 2014/0282220 | A1 | 9/2014 | Wantland et al. |
| 2014/0375680 | A1 | 12/2014 | Ackerman et al. |
| 2015/0009132 | A1 | 1/2015 | Kuriya et al. |
| 2015/0022444 | A1 | 1/2015 | Ooi |
| 2015/0193018 | A1 | 7/2015 | Venable et al. |
| 2015/0199005 | A1 | 7/2015 | Haddon |
| 2015/0213650 | A1 | 7/2015 | Barzuza et al. |
| 2015/0215351 | A1 | 7/2015 | Barzuza et al. |
| 2015/0215581 | A1 | 7/2015 | Barzuza et al. |
| 2015/0235267 | A1 | 8/2015 | Steube et al. |
| 2015/0277699 | A1 | 10/2015 | Algreatly |
| 2015/0302867 | A1 | 10/2015 | Tomlin et al. |
| 2016/0026242 | A1 | 1/2016 | Burns et al. |
| 2016/0027216 | A1 | 1/2016 | Da Veiga et al. |
| 2016/0066295 | A1* | 3/2016 | Han ............... G02B 27/017 345/8 |
| 2016/0077337 | A1 | 3/2016 | Raffle et al. |
| 2016/0148433 | A1 | 5/2016 | Petrovskaya et al. |
| 2016/0163063 | A1 | 6/2016 | Ashman |
| 2016/0217614 | A1 | 7/2016 | Kraver et al. |
| 2016/0253842 | A1* | 9/2016 | Shapira ............ G06T 19/006 345/633 |
| 2016/0284129 | A1 | 9/2016 | Nishizawa et al. |
| 2016/0308920 | A1 | 10/2016 | Brunsch et al. |
| 2017/0053443 | A1 | 2/2017 | Diament et al. |
| 2017/0060514 | A1 | 3/2017 | Kaufthal |
| 2017/0061696 | A1 | 3/2017 | Li et al. |
| 2017/0083993 | A1 | 3/2017 | Kurzman et al. |
| 2017/0092235 | A1 | 3/2017 | Osman et al. |
| 2017/0123489 | A1 | 5/2017 | Guenter |
| 2017/0123491 | A1 | 5/2017 | Hansen et al. |
| 2017/0139474 | A1 | 5/2017 | Rochford et al. |
| 2017/0185148 | A1 | 6/2017 | Kondo |
| 2017/0203213 | A1 | 7/2017 | Stafford |
| 2017/0232335 | A1 | 8/2017 | Williams et al. |
| 2017/0256096 | A1 | 9/2017 | Faaborg et al. |
| 2017/0263056 | A1 | 9/2017 | Leppanen et al. |
| 2017/0287225 | A1* | 10/2017 | Powderly ............ G06T 19/006 |
| 2017/0344127 | A1 | 11/2017 | Hu et al. |
| 2018/0046352 | A1 | 2/2018 | Johnson et al. |
| 2018/0095607 | A1 | 4/2018 | Proctor |
| 2018/0129459 | A1 | 5/2018 | Sylvan et al. |
| 2018/0165830 | A1 | 6/2018 | Danieau et al. |
| 2018/0173404 | A1* | 6/2018 | Smith .................. G06F 3/017 |
| 2018/0275753 | A1 | 9/2018 | Publicover et al. |
| 2018/0286126 | A1 | 10/2018 | Schwarz et al. |
| 2018/0293041 | A1 | 10/2018 | Harviainen |
| 2018/0350119 | A1 | 12/2018 | Kocharlakota et al. |
| 2019/0107721 | A1* | 4/2019 | Scott .................. G06F 3/013 |
| 2019/0196710 | A1* | 6/2019 | Jiang .................. G06F 3/011 |
| 2019/0197262 | A1 | 6/2019 | Jiang et al. |
| 2019/0197994 | A1 | 6/2019 | Kunitomo et al. |
| 2019/0227763 | A1 | 7/2019 | Kaufthal |
| 2019/0272138 | A1 | 9/2019 | Krauss et al. |
| 2020/0020162 | A1 | 1/2020 | Jones et al. |
| 2020/0089313 | A1 | 3/2020 | Himane |
| 2020/0103962 | A1 | 4/2020 | Burns |
| 2020/0193938 | A1 | 6/2020 | Estruch Tena et al. |
| 2020/0219469 | A1 | 7/2020 | Mittal et al. |
| 2020/0293177 | A1 | 9/2020 | Iglesias |
| 2021/0084259 | A1 | 3/2021 | Kies et al. |
| 2021/0342044 | A1 | 11/2021 | Xu |
| 2021/0366440 | A1 | 11/2021 | Burns et al. |
| 2021/0368136 | A1 | 11/2021 | Chalmers et al. |
| 2022/0011860 | A1* | 1/2022 | Cappello ............... G06T 13/40 |
| 2022/0044481 | A1 | 2/2022 | Tzeng et al. |
| 2022/0327190 | A1 | 10/2022 | Yan et al. |
| 2023/0008291 | A1 | 1/2023 | Burns |
| 2023/0334793 | A1 | 10/2023 | Burns et al. |
| 2023/0388453 | A1 | 11/2023 | Chalmers et al. |
| 2024/0112649 | A1 | 4/2024 | Burns et al. |
| 2024/0272708 | A1 | 8/2024 | Burns |
| 2024/0275922 | A1 | 8/2024 | Chalmers et al. |

FOREIGN PATENT DOCUMENTS

| | | |
|---|---|---|
| CN | 104081319 A | 10/2014 |
| CN | 104115100 A | 10/2014 |
| CN | 105431763 A | 3/2016 |
| CN | 106716302 A | 5/2017 |
| CN | 107004303 A | 8/2017 |
| CN | 107340853 A | 11/2017 |
| CN | 107534656 A | 1/2018 |
| CN | 107924299 A | 4/2018 |
| CN | 108136258 A | 6/2018 |
| CN | 108139803 A | 6/2018 |
| EP | 3039555 A1 | 7/2016 |
| JP | 2013-161247 A | 8/2013 |
| JP | 2015-143976 A | 8/2015 |
| WO | 2003/058518 A2 | 7/2003 |
| WO | 2014/113408 A1 | 7/2014 |
| WO | 2015/140106 A1 | 9/2015 |
| WO | 2016/014872 A1 | 1/2016 |
| WO | 2016/073986 A1 | 5/2016 |
| WO | 2017/021902 A1 | 2/2017 |
| WO | 2017/171943 A1 | 10/2017 |

OTHER PUBLICATIONS

Notice of Allowance received for U.S. Appl. No. 17/397,726, mailed on Jun. 12, 2023, 6 pages.

Applicant-Initiated Interview Summary received for U.S. Appl. No. 16/552,549, mailed on Jan. 26, 2022, 4 pages.

Applicant-Initiated Interview Summary received for U.S. Appl. No. 16/552,549, mailed on Mar. 25, 2021, 3 pages.

Applicant-Initiated Interview Summary received for U.S. Appl. No. 16/552,549, mailed on Sep. 3, 2021, 4 pages.

Corrected Notice of Allowance received for U.S. Appl. No. 16/552,549, mailed on Mar. 3, 2022, 6 pages.

Corrected Notice of Allowance received for U.S. Appl. No. 16/552,549, mailed on Mar. 31, 2022, 3 pages.

Corrected Notice of Allowance received for U.S. Appl. No. 16/651,249, mailed on Feb. 18, 2021, 2 pages.

Dedual et al., "Creating hybrid user interfaces with a 2D multi-touch tabletop and a 3D see-through head-worn display", IEEE International Symposium on Mixed and Augmented Reality 2011 Science and Technology Proceedings, Oct. 26-29, 2011, 2 pages.

Final Office Action received for U.S. Appl. No. 16/552,549, mailed on Dec. 3, 2021, 16 pages.

Fitzmaurice et al., "Bricks: Laying the Foundations for Graspable User Interfaces", May 7-11, 1995, pp. 442-449.

International Preliminary Report on Patentability received for PCT Patent Application No. PCT/US2018/052748, mailed on Apr. 9, 2020, 11 pages.

International Preliminary Report on Patentability received for PCT Patent Application No. PCT/US2020/048845, mailed on Apr. 7, 2022, 14 pages.

International Preliminary Report on Patentability received for PCT Patent Application No. PCT/US2020/052886, mailed on Apr. 7, 2022, 15 pages.

International Preliminary Report on Patentability received for PCT Patent Application No. PCT/US2021/037683, mailed on Jan. 5, 2023, 14 pages.

(56) References Cited

OTHER PUBLICATIONS

International Search Report and Written Opinion Received for PCT Patent Application No. PCT/US2018/052748, mailed on Dec. 14, 2018, 12 pages.
International Search Report and Written Opinion received for PCT Patent Application No. PCT/US2020/048845, mailed on Feb. 1, 2021, 20 pages.
International Search Report and Written Opinion received for PCT Patent Application No. PCT/US2020/052886, mailed on Feb. 1, 2021, 22 pages.
International Search Report and Written Opinion received for PCT Patent Application No. PCT/US2021/037683, mailed on Dec. 10, 2021, 19 pages.
Invitation to Pay Additional Fees received for PCT Patent Application No. PCT/US2020/048845, mailed on Dec. 4, 2020, 13 pages.
Invitation to Pay Additional Fees received for PCT Patent Application No. PCT/US2020/052886, mailed on Dec. 9, 2020, 15 pages.
Invitation to Pay Additional Fees received for PCT Patent Application No. PCT/US2021/037683, mailed on Oct. 19, 2021, 11 pages.
Non-Final Office Action received for U.S. Appl. No. 16/552,549, mailed on Jun. 29, 2021, 15 pages.
Non-Final Office Action received for U.S. Appl. No. 16/552,549, mailed on Nov. 12, 2020, 15 pages.
Non-Final Office Action received for U.S. Appl. No. 17/397,726, mailed on May 12, 2022, 9 pages.
Non-Final Office Action received for U.S. Appl. No. 17/397,734, mailed on Apr. 14, 2022, 31 pages.
Notice of Allowance received for Chinese Patent Application No. 201910868273.0, mailed on Feb. 8, 2022, 4 pages (1 page of English Translation and 3 pages of Official Copy).
Notice of Allowance received for U.S. Appl. No. 16/552,549, mailed on Feb. 24, 2022, 10 pages.
Notice of Allowance received for U.S. Appl. No. 16/651,249, mailed on Jan. 27, 2021, 11 pages.
Notice of Allowance received for U.S. Appl. No. 17/397,734, mailed on Sep. 19, 2022, 7 pages.
Office Action received for Chinese Patent Application No. 201910868273.0, mailed on Sep. 24, 2021, 24 pages (12 pages of English Translation and 12 pages of Official Copy).
Office Action received for Chinese Patent Application No. 202080026912.X, mailed on Nov. 8, 2022, 9 pages (5 pages of English Translation and 4 pages of Official Copy).
Piekarski et al., "Integrating Virtual and Augmented Realities in an Outdoor Application", IEEE; Feb. 1999, 10 pages.
Regenbrecht et al., "A tangible AR desktop environment", Computers & Graphics, vol. 25, No. 5, Oct. 2001, pp. 755-763.
Shaer et al., "Tangible User Interfaces: Past, Present, and Future Directions", Foundations and Trends? In Human-Computer Interaction, vol. 3, No. 1-2,, 2009, pp. 1-137.
The Dynamic Desktop (in the office of the future . . . )—YouTube, Online Available at: https://www.youtube.com/watch?v=m9IZfnRrM4Y, Aug. 20, 2014, 2014, 1 page.
Zinchenko et al., "Virtual Reality Control of a Robotic Camera Holder for Minimally Invasive Surgery", 2017 11th Asian Control Conference (ASCC) Gold Coast Convention Centre, Australia, Dec. 17-20, 2017, 6 pages.
2015-143976, JP, A, Cited by Chinese Patent Office in an Office Action for related Patent Application No. 201880063519.0 on Dec. 15, 2022.
Non-Final Office Action received for U.S. Appl. No. 17/845,863, mailed on Apr. 11, 2023, 34 pages.

Notice of Allowance received for Chinese Patent Application No. 202080026912.X, mailed on Mar. 7, 2023, 2 pages (1 page of English Translation and 1 page of Official Copy).
Corrected Notice of Allowance received for U.S. Appl. No. 17/397,726, mailed on May 4, 2023, 2 pages.
Intention to Grant received for European Patent Application No. 20775103.3, mailed on May 9, 2023, 9 pages.
Extended European Search Report received for European Patent Application No. 23198001.2, mailed on Dec. 4, 2023, 10 pages.
Fares et al., "Can we beat the mouse with MAGIC?", CHI 2013: Changing Perspectives, Apr. 27-May 2, 2013, pp. 1387-1390.
Jalaliniya et al., "MAGIC Pointing for Eyewear Computers", ISWC '15, Online Available at: http://dx.doi.org/10.1145/2802083.2802094, Sep. 7-11, 2015, pp. 155-158.
Supplemental Notice of Allowance received for U.S. Appl. No. 18/099,862, mailed on Dec. 20, 2023, 4 pages.
Zhai et al., "Manual and Gaze Input Cascaded (MAGIC) Pointing", ACM CHI, May 15-20, 1999, pp. 246-253.
Final Office Action received for U.S. Appl. No. 17/845,863, mailed on Aug. 22, 2023, 35 pages.
107340853, CN, A, Cited by Chinese Patent Office in an Office Action for related Patent Application No. 202080026912.X on Nov. 8, 2022.
Notice of Allowance received for U.S. Appl. No. 17/397,726, mailed on Feb. 15, 2023, 6 pages.
Office Action received for Chinese Patent Application No. 201880063519.0, mailed on Dec. 15, 2022, 11 pages (5 pages of English Translation and 6 pages of Official Copy).
Applicant-Initiated Interview Summary received for U.S. Appl. No. 17/845,863, mailed on Sep. 22, 2023, 4 pages.
Decision to Grant received for European Patent Application No. 20775103.3, mailed on Sep. 21, 2023, 2 pages.
Notice of Allowance received for U.S. Appl. No. 18/099,862, mailed on Sep. 15, 2023, 15 pages.
Notice of Allowance received for Chinese Patent Application No. 201880063519.0, mailed on Feb. 14, 2023, 2 pages (1 page of English Translation and 1 page of Official Copy).
Non-Final Office Action received for U.S. Appl. No. 18/540,480, mailed on Aug. 1, 2024, 42 pages.
Notice of Allowance received for Chinese Patent Application No. 202080027017.X, mailed on Jul. 16, 2024, 2 pages (1 page of English Translation and 1 page of Official Copy).
Notice of Allowance received for U.S. Appl. No. 17/845,863, mailed on Feb. 12, 2024, 10 pages.
Non-Final Office Action received for U.S. Appl. No. 17/845,863, mailed on Oct. 24, 2023, 17 pages.
Notice of Allowance received for U.S. Appl. No. 18/231,437, mailed on Feb. 29, 2024, 10 pages.
2013-161247, JP, A, Cited by Chinese Patent Office in an Office Action for related Patent Application No. 202080027017.X on Mar. 8, 2024.
Applicant-Initiated Interview Summary received for U.S. Appl. No. 18/540,480, mailed on Sep. 4, 2024, 4 pages.
Applicant-Initiated Interview Summary received for U.S. Appl. No. 17/845,863, mailed on Nov. 21, 2023, 4 pages.
Supplemental Notice of Allowance received for U.S. Appl. No. 18/099,862, mailed on Nov. 13, 2023, 2 pages.
Final Office Action received for U.S. Appl. No. 18/540,480, mailed on Sep. 18, 2024, 48 pages.
Office Action received for Chinese Patent Application No. 202080027017.X, mailed on Mar. 8, 2024, 21 pages (4 pages of English Translation and 17 pages of Official Copy).

* cited by examiner

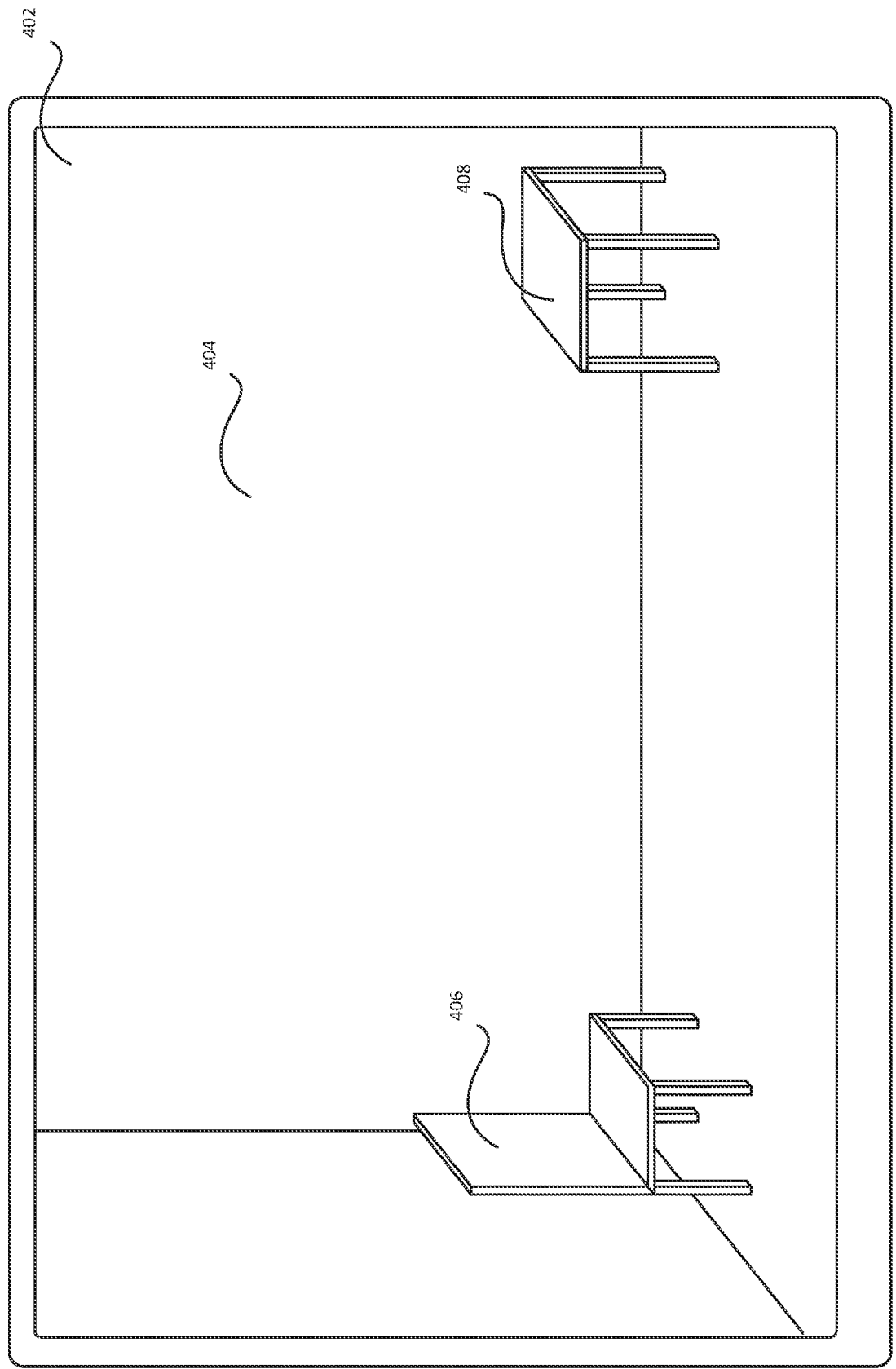

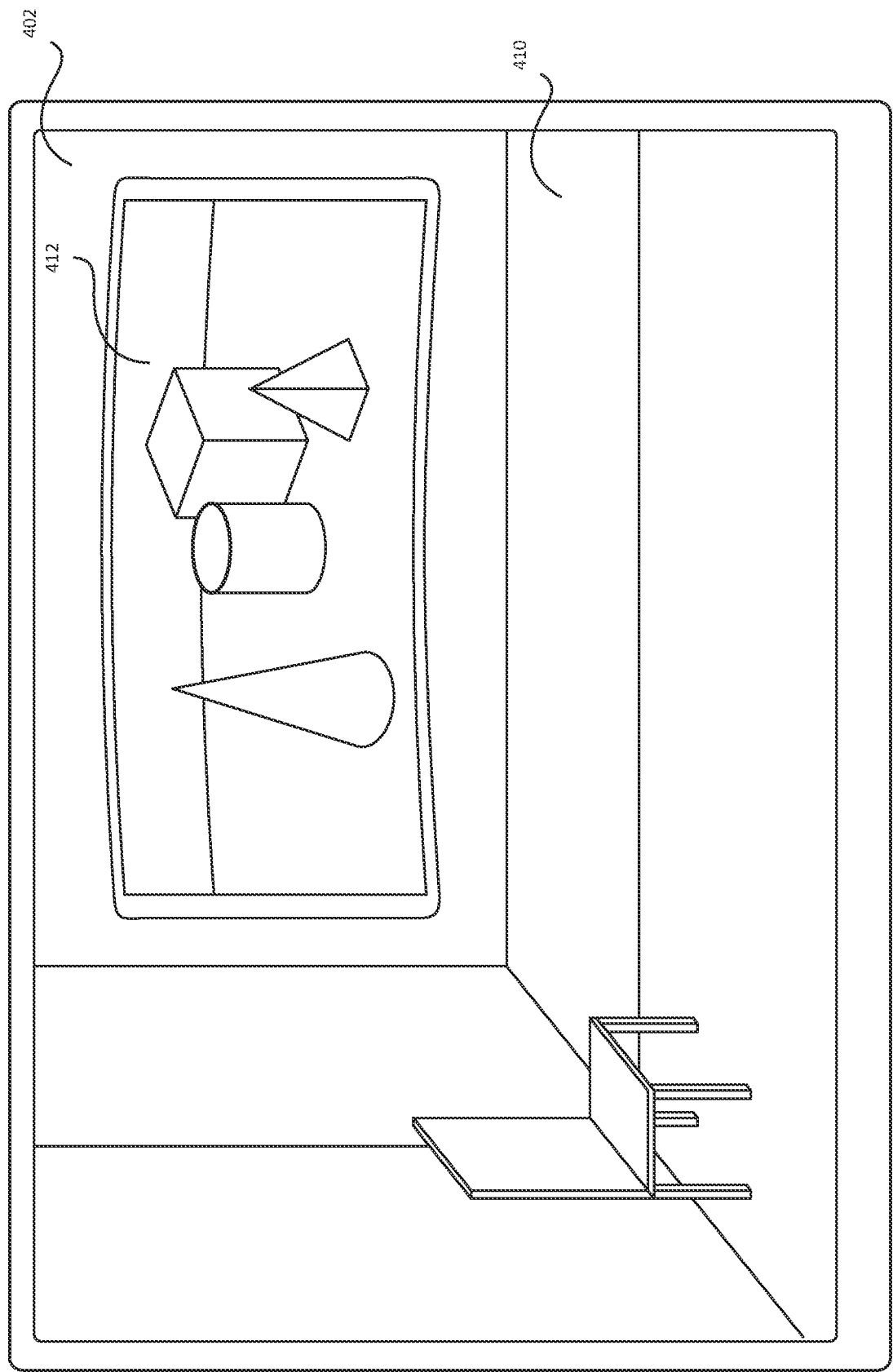

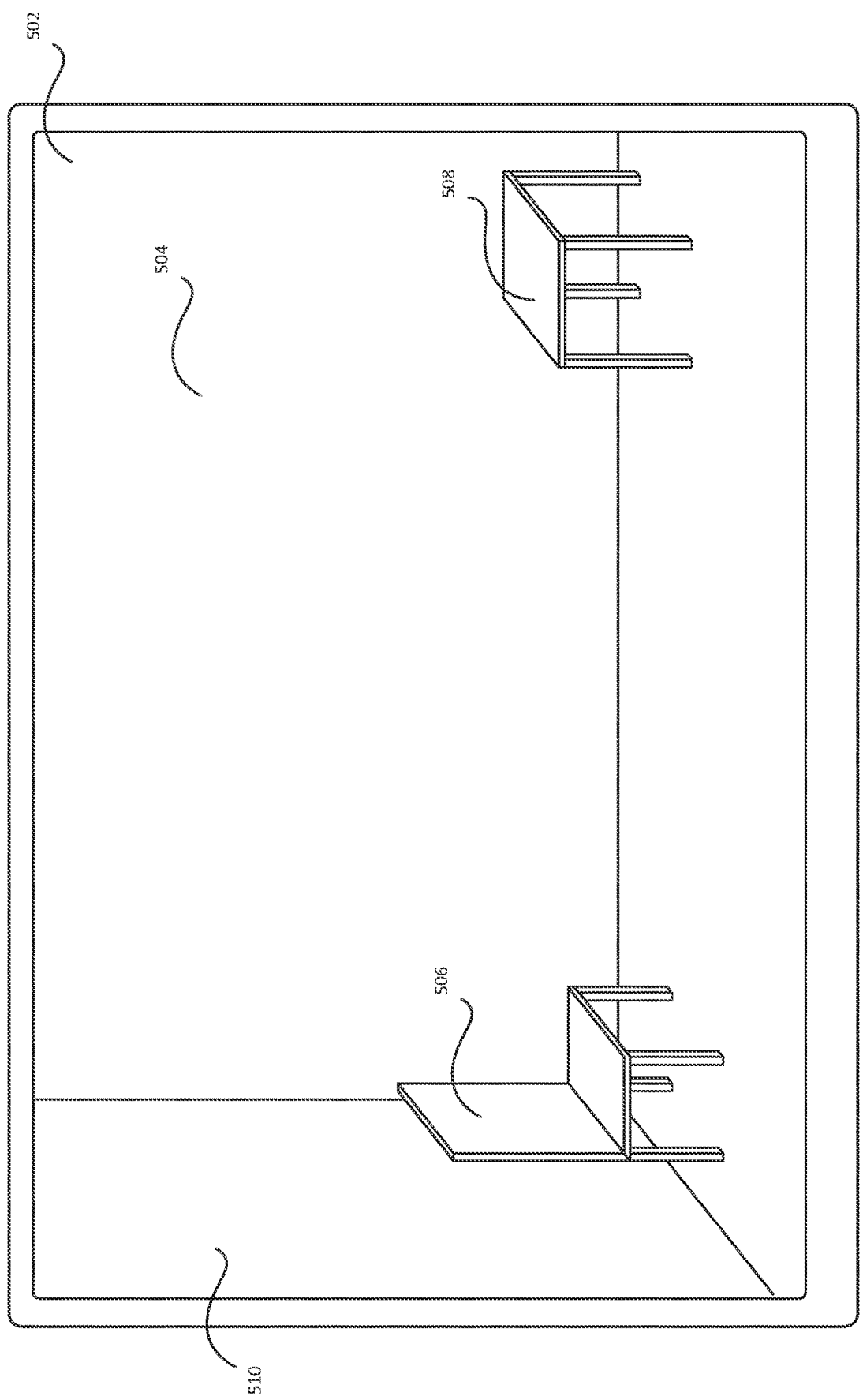

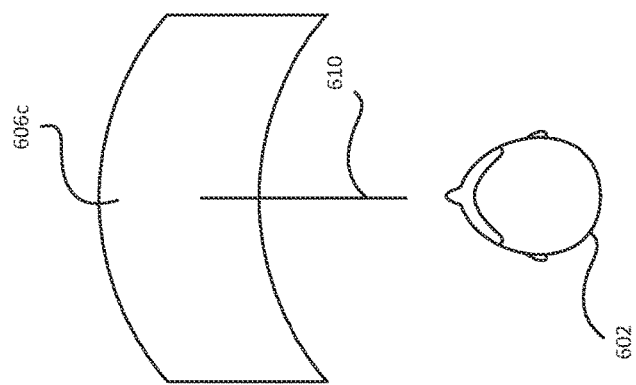
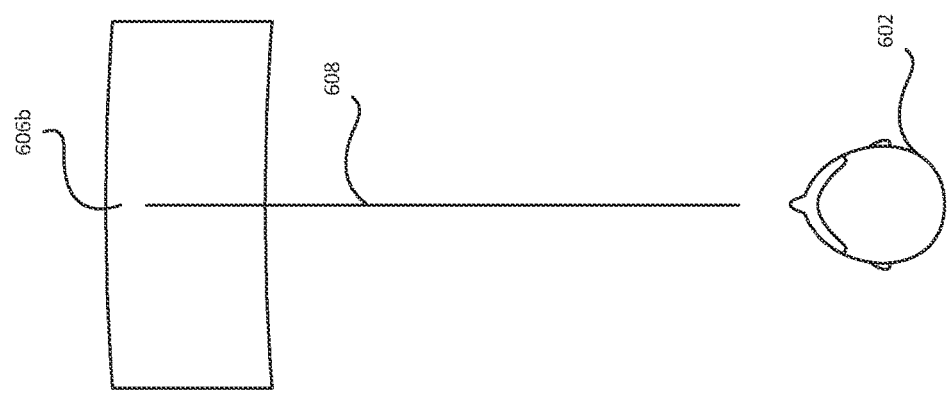
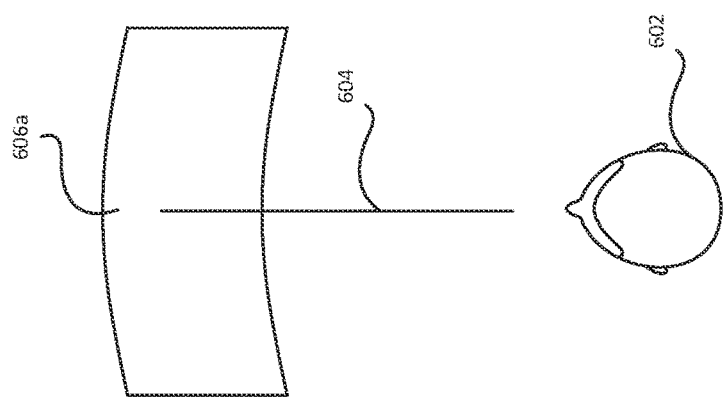
FIG. 6

DISPLAYING A VIRTUAL DISPLAY

CROSS REFERENCE TO RELATED APPLICATIONS

This application is a continuation of PCT Application No. PCT/US2021/37683, entitled "DISPLAYING A VIRTUAL DISPLAY," filed Jun. 16, 2021, which claims priority to U.S. Provisional Application No. 63/146,453, entitled "DISPLAYING A VIRTUAL DISPLAY," filed Feb. 5, 2021, and to U.S. Provisional Application No. 63/042,322, entitled "DISPLAYING A VIRTUAL DISPLAY," filed Jun. 22, 2020, the content of each of which are hereby incorporated by reference in their entirety for all purposes.

BACKGROUND

1. Field

The present disclosure relates generally to extended reality, and more specifically to techniques for displaying a virtual display in an extended reality setting.

2. Description of Related Art

Conventional extended reality settings may include representations of a virtual display. The virtual displays may be depicted within the extended reality settings in various ways.

BRIEF SUMMARY

The present disclosure describes techniques for displaying a virtual display in an extended reality setting. Various conventional systems may be equipped to display media to a user in an extended reality setting, such as via a virtual display within the extended reality setting. However, given the increasing complexity of extended reality systems, conventional techniques for displaying media to a user are not compatible with various new extended reality modes. For example, conventional systems are unable to adequately display media to a user when the user is viewing an environment using augmented reality. Given the difficulties of simultaneously displaying both representations of actual content and virtual content, a method and system for displaying a virtual display in an extended reality setting is desired.

According to some embodiments, a set of parameters corresponding to characteristics of a physical setting of a user is obtained. Based on the parameters, at least one display placement value and a fixed boundary location corresponding to the physical setting are obtained. In accordance with a determination that the at least one display placement value satisfies a display placement criterion, a virtual display is displayed at the fixed boundary location corresponding to the physical setting.

BRIEF DESCRIPTION OF FIGURES

FIGS. 4A-4B depict an exemplary process for displaying a virtual display in a virtual room.

FIGS. 5A-5B depict an exemplary process for displaying virtual objects associated with displayed media on a virtual display.

FIG. 6 depicts an exemplary adjustment of the curvature of a virtual display.

DESCRIPTION

Figure 1A:
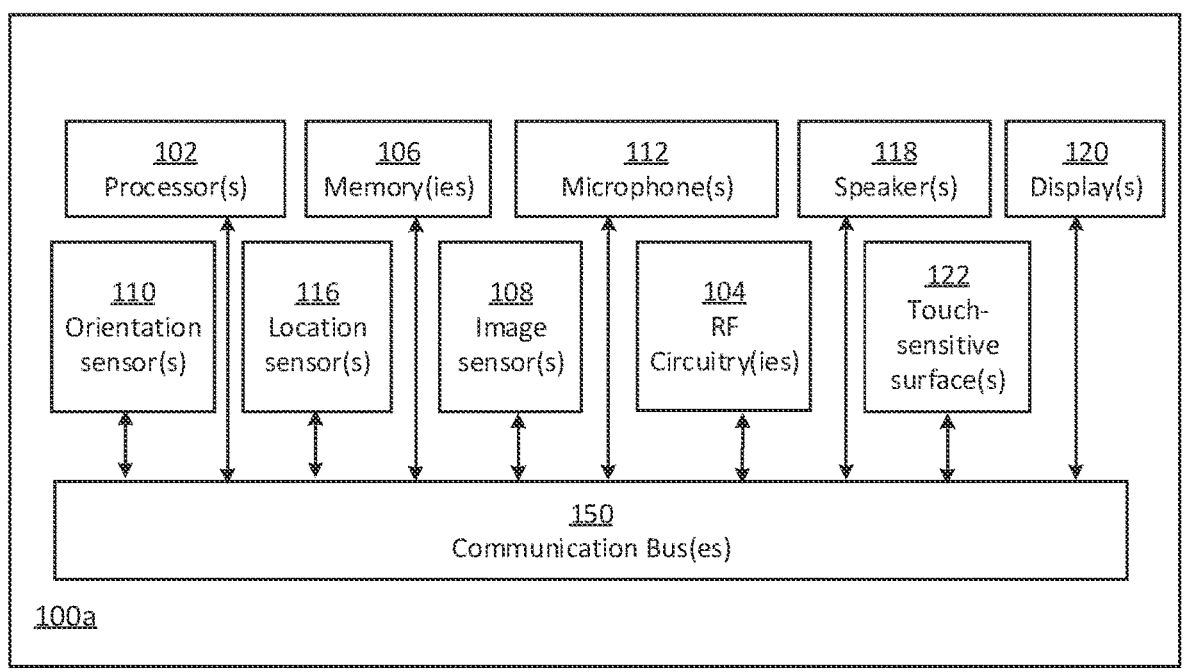
FIGS. 1A-1B depict exemplary systems for use in various computer extended reality technologies.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples includes heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

Figure 1B:
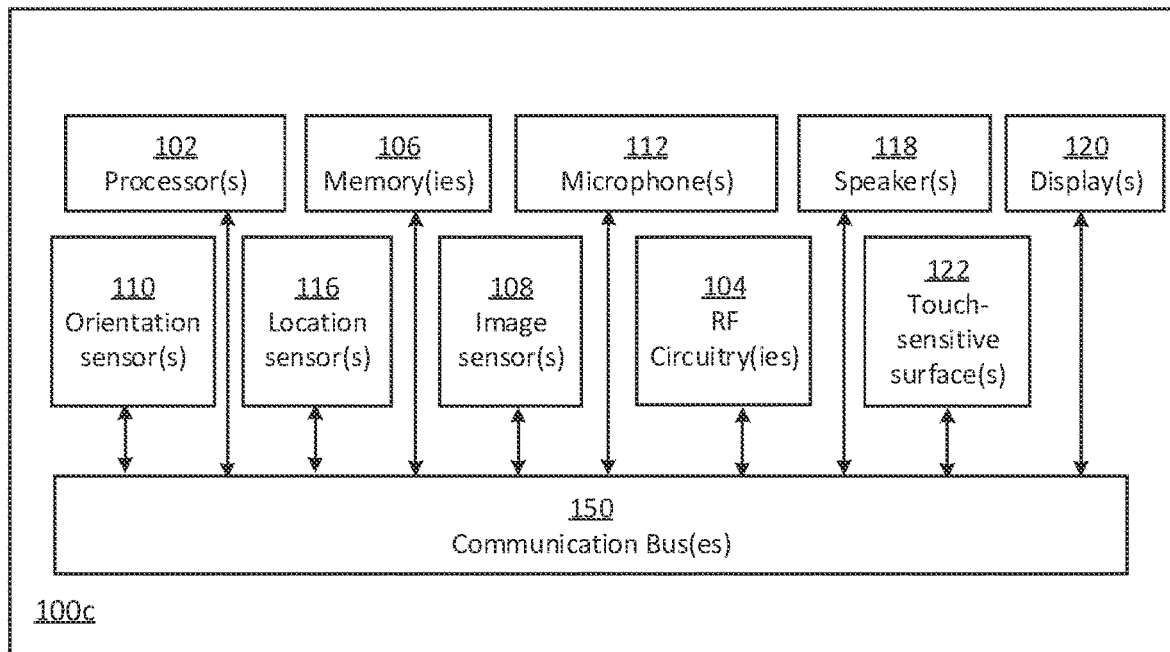

FIG. 1A and FIG. 1B depict exemplary system 100 for use in various extended reality technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of system 100 are implemented in a second device (e.g., a head-mounted device). In some examples, device 100a is implemented in a base station device or a second device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. Display(s) 120 may have an opaque display. Display(s) 120 may have a transparent or semi-transparent display that may incorporate a substrate through which light representative of images is directed to an individual's eyes. Display(s) 120 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 120 include heads up displays, automotive windshields with the ability to display graphics, windows with the ability to display graphics, lenses with the ability to display graphics, tablets, smartphones, and desktop or laptop computers. Alternatively, system 100 may be designed to receive an external display (e.g., a smartphone). In some examples, system 100 is a projection-based system that uses retinal projection to project images onto an individual's retina or projects virtual objects into a physical setting (e.g., onto a physical surface or as a holograph).

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensor(s) 108 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 108 also optionally include one or more event camera(s) configured to capture movement of physical elements in the physical setting. Image sensor(s) 108 also optionally include one or more depth sensor(s) configured to detect the distance of physical elements from system 100. In some examples, system 100 uses CCD sensors, event cameras, and depth sensors in combination to detect the physical setting around system 100. In some examples, image sensor(s) 108 include a first image sensor and a second image sensor. The first image sensor and the second image sensor are optionally configured to capture images of physical elements in the physical setting from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the physical setting. For example, system 100 uses image sensor(s) 108 to track the position and orientation of display(s) 120 relative to one or more fixed elements in the physical setting.

In some examples, system 100 includes microphone(s) 112. System 100 uses microphone(s) 112 to detect sound from the user and/or the physical setting of the user. In some examples, microphone(s) 112 includes an array of microphones (including a plurality of microphones) that optionally operate in tandem, such as to identify ambient noise or to locate the source of sound in space of the physical setting.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical elements in the physical setting. Orientation sensor(s) 110 optionally include one or more gyroscopes and/or one or more accelerometers.

With reference now to FIGS. 2A-7, exemplary techniques for displaying a virtual display in an extended reality setting are described.

Figure 2A:
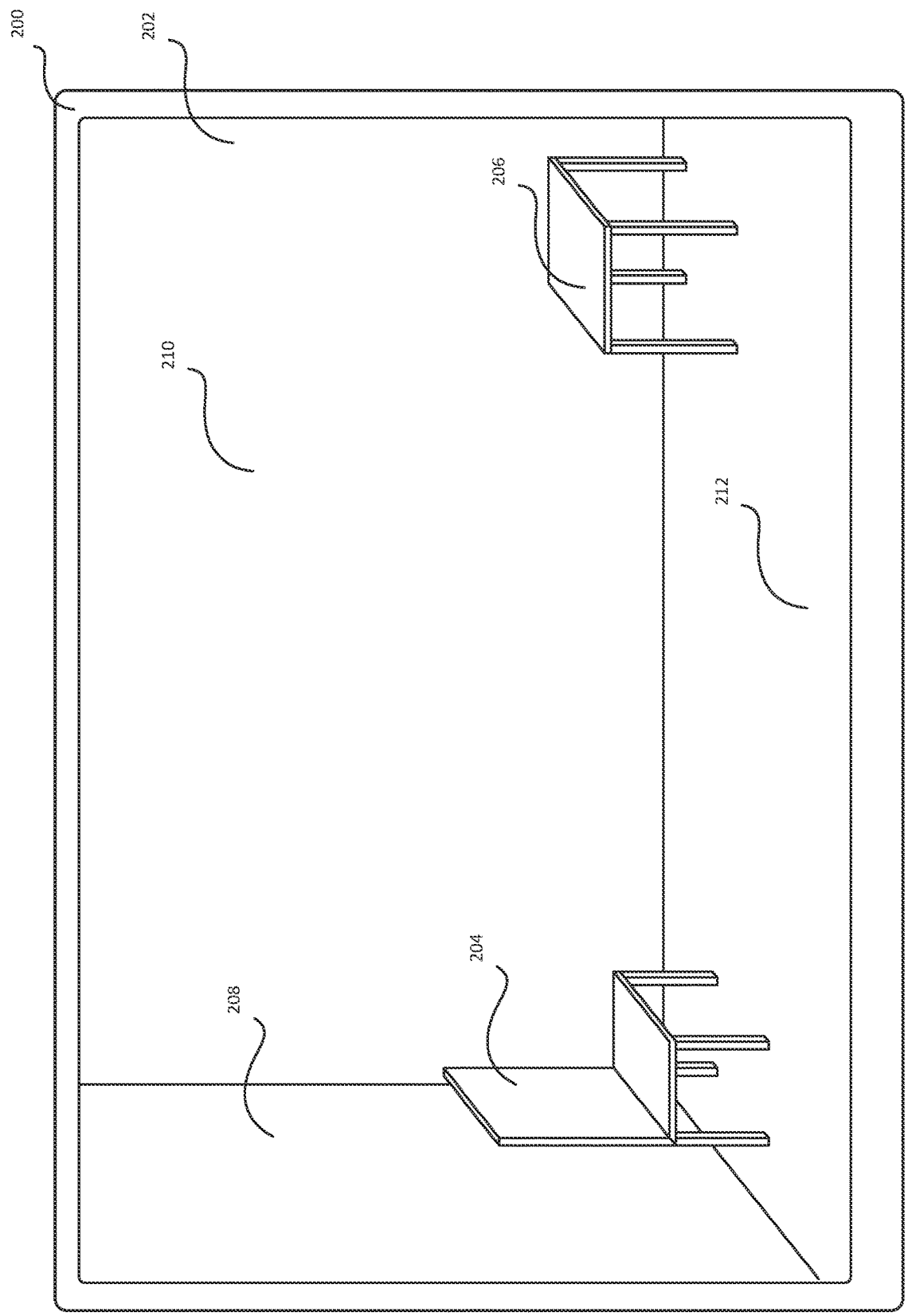
FIGS. 2A-2C depict an exemplary process for displaying a virtual display.
Figure 2B:
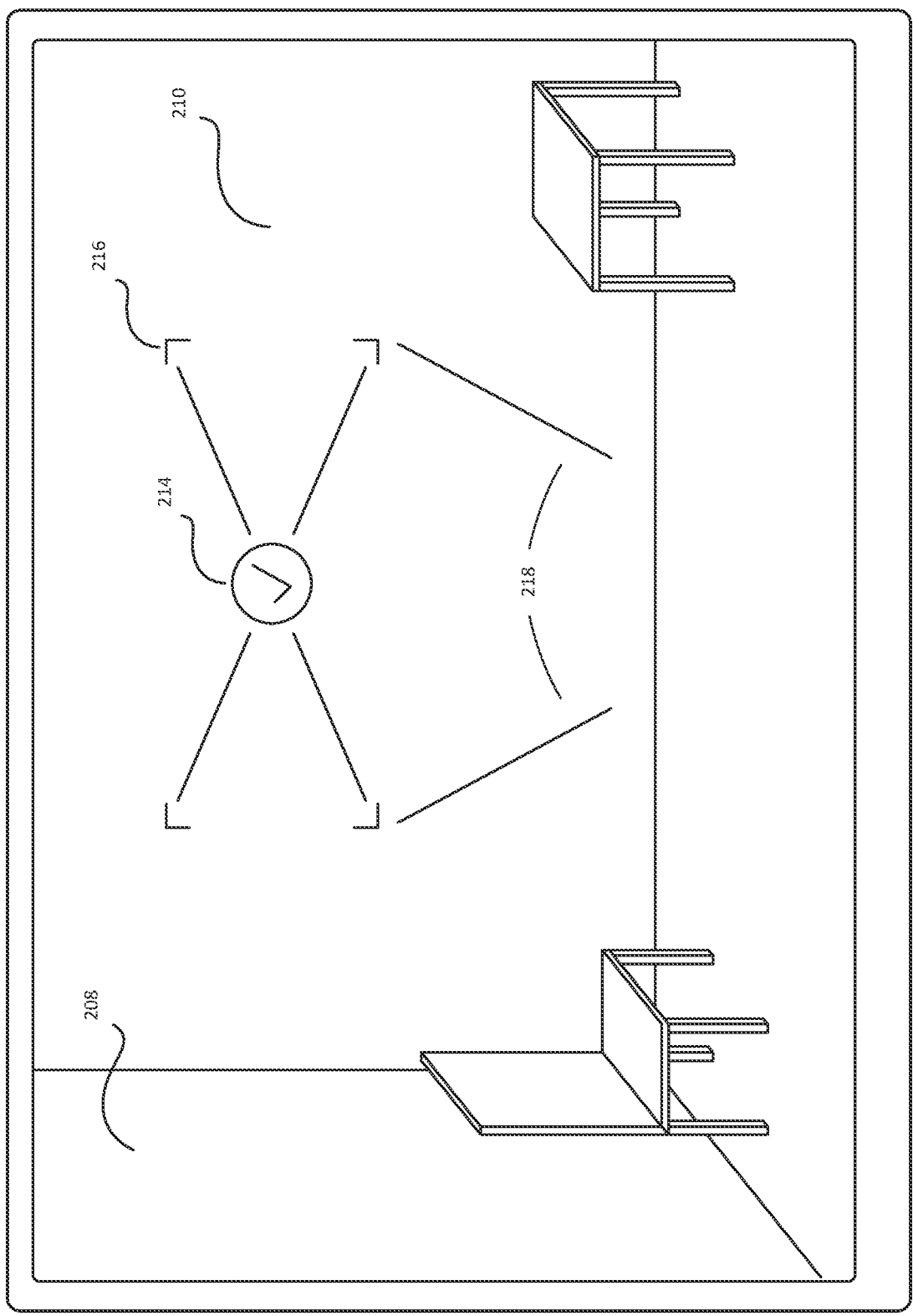
Figure 2C:
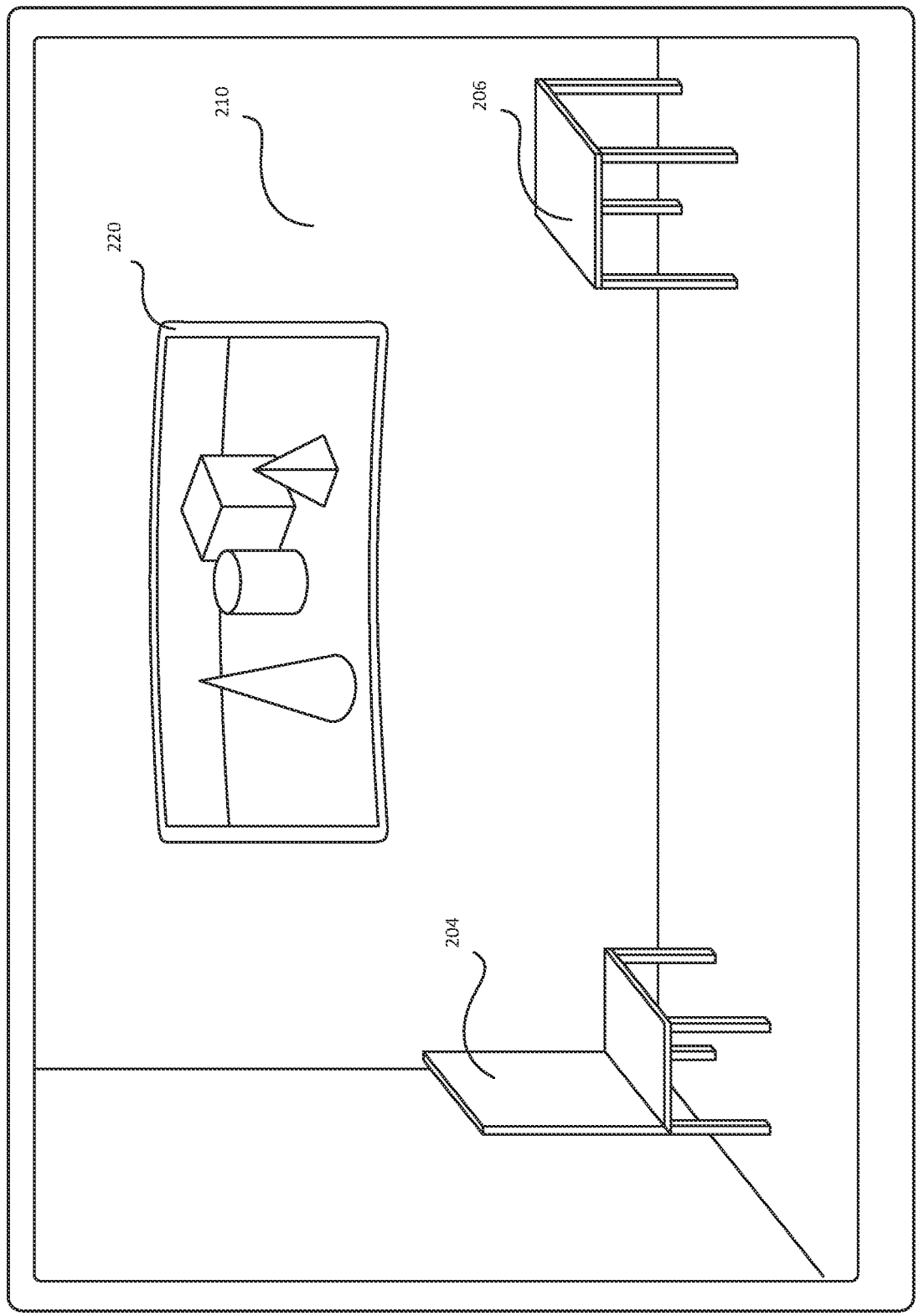

FIGS. 2A-2C depict an exemplary process for displaying a virtual display in an XR setting. Electronic device 200 of FIG. 2A may display XR setting 202, which may include a representation of a physical setting of a user. The representation of the physical setting may include representations of various physical objects located in the physical setting, such as a chair representation 204 and a table representation 206. The physical setting may be associated with various characteristics, such as but not limited to object locations, area dimensions, acoustic parameters, and brightness levels, for example. In some examples, the characteristics of the physical setting include characteristics to aid in determining a desirable location for positioning a display, such as the location of a wall within the physical setting. Such characteristics may include floor dimensions, wall dimensions, ceiling dimensions, object locations, and the like. The characteristics may be represented as coordinates, dimensions, magnitudes, sizes, or other values maintained in a data structure representing characteristics of physical objects in three-dimensional space, for example. With respect to XR setting 202, the physical chair corresponding to the chair representation 204 and the physical table corresponding to table representation 206 may each be associated with characteristics such as an object location, object size characteristics, object shape characteristics, and the like. XR setting 202 may further include representations of various boundaries, such as wall representation 208, wall representation 210, and floor representation 212. The physical boundaries corresponding to the representations of the various boundaries may each be associated with characteristics such as wall height, wall width, floor length, floor width, wall object locations (e.g., for objects attached to or proximate to a wall), floor object locations (e.g., for objects resting on the floor), and the like.

In some examples, the user may view the representation of the physical setting and objects within the physical setting via an opaque display. In particular, the opaque display may display images to the user, such as images representing the physical setting and objects within the physical setting. The images may be captured by one or more cameras communicatively coupled to the opaque display. In some examples, the user may view the physical setting and objects within the physical setting via an additive or otherwise partially transparent display. For instance, the display may comprise components to permit a user to see through a portion of the display (e.g., using one or more transparent additive layers including holographic optical elements). Accordingly, the XR setting, including the representation of the physical setting (and objects within the setting), may viewed as a video image when using the opaque display. Alternatively, the actual physical setting (and objects within the setting) may be directly viewed by the user as part of the XR setting when using the additive display.

A user viewing displayed XR setting 202 may provide one or more inputs to initiate media playback, such as playing a movie, TV show, sports or news broadcast, and the like. In some examples, the media may correspond to media content created by the user, such as user-created photos, videos, slideshows, and the like. The user may initiate playback in a variety of ways, such as via one or more controller inputs, speech inputs, gaze inputs, or any combination of the above. For example, the user may interact with a menu displayed within XR setting 202 in order to make various selections leading to the desired media content. The user may additionally or alternatively utter a predefined spoken trigger, followed by a command, such as "OK system, open the TV." Upon detecting the spoken trigger, the system may utilize natural language processing techniques to identify speech following the spoken trigger, including the speech "turn on the TV." For example, using speech-to-text processing, the system may convert the speech into recognizable text. A user intent corresponding to the recognizable text may be determined using one or more known techniques. In this example, the text "turn on the TV" may correspond to a user intent for displaying a virtual display in the XR setting. In accordance with determination that the user desires to display a virtual display, a media delivery model is utilized in order to properly display the virtual display in the XR setting, as described herein.

In general, the media delivery model facilitates the virtual display placement within a respective XR setting. By accepting environmental characteristics of the physical setting as input, the media delivery model provides results for a desirable placement of the virtual display in the XR setting, such as parameters related to display position, display size, display curvature, and the like. For instance, the media delivery model may process the environmental characteristics of the physical setting based on standards for a desirable placement of a display (e.g., THX standards), as described herein. Such standards may recommend specific viewing angles, or a viewing angle range, for positioning a display. For example, a specific room corresponding to the physical setting may include several large walls and corresponding floor area in front of the walls. Based on the display placement standards, the media delivery model may identify a specific fixed boundary location corresponding to the physical setting as well-suited for placement of a display (e.g., a wall having a large flat area, a wall associated with a large floor area surrounding the wall, a wall or other boundary with no obstruction of view, etc.). Given the environmental characteristics, a virtual display size may also be determined by the media delivery model. For example, based on a relatively smaller wall size and/or a relatively smaller available floor area surrounding the wall (e.g., potential display viewing area), a relatively smaller virtual display size may be utilized for displaying the virtual display. As a result, a virtual display may be depicted within the XR setting that is tailored and well-suited for a physical setting having relatively smaller-sized environmental characteristics.

The virtual display may be depicted within the XR setting as attached or otherwise mounted on a representation of a wall boundary within the physical setting, as described with respect to FIGS. 2A-2C. Alternatively, the virtual display may be depicted as "floating" in front of the user perspective within the XR setting, as described with respect to FIGS. 3A-3C. In this example, where no wall or boundary exists that provides desirable placement for a display (e.g., the user is outside in a park), the media delivery model may output an indication to display a virtual display as "floating" in front of the user. In this example, the media delivery model may output placement values in accordance with the display placement standards in order to display the virtual displays "floating" in front of the user at a desirable perceived distance in front of the user and at a desirable perceived size.

In some examples, the virtual display may be depicted as mounted within a virtual room displayed within the XR setting, as described with respect to FIGS. 4A-4B. For example, the XR setting may include a virtual "movie theater" room in order to enhance the viewing experience of the user viewing content on the virtual display. The virtual "movie theater" room may be displayed by removing the representations of one or more walls within the XR setting, for example, such that the virtual "movie theater" room appears as an extension of the user's physical setting. In these examples, the virtual display may be depicted as corresponding to a relatively large screen (e.g., the size of an actual movie theater screen). Virtual content associated with the virtual display may also be depicted within the XR setting, as described with respect to FIGS. 5A-5B.

With reference to FIG. 2B, a set of parameters corresponding to characteristics of the physical setting of the user may be obtained. For example, a set of parameters corresponding to characteristics associated with wall representation 208 and wall representation 210 are obtained. The set of parameters may additionally include characteristics for boundaries not depicted within XR setting 202, such as additional wall boundary characteristics, floor boundary characteristics, ceiling boundary characteristics, and the like. The set of parameters may include parameters for wall area, wall depth from a user's viewing perspective, wall angle with respect to a user's viewing perspective, and the like. Once obtained, the set of parameters may be provided to a media delivery model. The media delivery model may accept, as input, the set of parameters for determining a desirable placement of a display within a physical setting. Various standards may include specifications for a desirable placement of a display within a room (e.g., THX certification standards).

The standards for a desirable placement of a display may recommend specific viewing angles, or a viewing angle range, for positioning a display. A specific viewing angle for a desirable display placement may correspond to the maximum angle from a farthest potential viewing position to the display screen (e.g., 50 feet away), such as a 36 degree viewing angle, for example. As another example, a specific viewing angle for desirable display placement may correspond to an angle from an ideal potential viewing position to a specifically sized display screen (e.g., 40 feet away from the center of a 90 foot by 30 foot display screen), such as a 45 degree viewing angle, for example. As a result, a user position or viewing perspective which is too close to a display screen would not satisfy the viewing angle. For example, the user's actual viewing angle may be less than the recommended viewing angle, such that the user cannot view the entire screen given a reasonable viewing position (e.g., the user may be required to move their head at an uncomfortable angle to view certain portions of the display screen, and/or such portions of the display screen are difficult to view given the user's head position). The recommended parameters for a desirable placement of a display within a room may also vary depending on the size of the display to be positioned. As an example, when a user's actual viewing angle is less than the recommended viewing angle, a smaller display may result in the actual viewing angle satisfying the recommended viewing angle (e.g., a user positioned three feet in front of a smaller screen provides a better viewing angle than a user positioned three feet in front of a larger screen).

Based on the set of parameters, one or more display placement values and a fixed boundary location is determined. The display placement values and fixed boundary location may be determined by and provided as a result from the media delivery model, for example. The display placement values may represent various parameters indicating display positioning and size information in order to position a virtual display within XR setting 202, for example. In some examples, the media delivery model determines the display placement values and fixed boundary location by receiving the set of parameters as input and processing the input using the specifications for display placement. In turn, the display placement parameters may be obtained based on various determinations as to whether the XR setting includes any potential locations for displaying a virtual display. For example, input to the delivery model may include at least the characteristics associated with wall representation 208 and wall representation 210. These characteristics may represent the area of wall representation 208, the area of wall representation 210, distances between the user's viewing perspective and specific points along wall representation 208, distances between the user's viewing perspective and specific points along wall representation 210, and the like. The display placement values may indicate a virtual display size and corresponding positioning information within XR setting 202. The display placement values may include a display center position 214 within the XR setting, for example. The display placement values may further include display size parameters 216, such as cross-sectional display lengths, display corner positions, display widths, display heights, and the like. The display placement values depicted in FIG. 2B are generally not displayed or otherwise indicated to the user, and are instead provided for illustrative purposes. However, in some examples, display placement values may be provided to a user (e.g., a system administrator, a developer, and the like).

Upon determining the one or more display placement values and fixed boundary location, a determination is made whether one or more display placement values satisfy a display placement criterion. The display placement criterion may represent threshold display parameters considered acceptable for desirable user viewing experience, such as maximum and/or minimum display sizes, maximum and/or minimum distances between the user's viewing perspective, maximum and/or minimum display curvature, and the like. The display placement criterion may be obtained from the media delivery model, such as obtained directly (or derived) from one or more standards including specifications for a desirable display placement. In some examples, the display placement criterion may be created, modified, or otherwise customized by a user (e.g., a developer). As an example, the display center position 214 and display size parameters 216 may be determined to satisfy a display placement criterion on the basis that the resultant virtual display location provides a satisfactory viewing angle based on the user perspective depicted in FIG. 2B (e.g., within a recommended viewing angle range obtained from a display placement standard). For example, display center position 214 and display size parameters 216 may result in a viewing angle 218, such as a viewing angle of 40 degrees, for example. The display placement values received from the media delivery model may indicate a recommended viewing angle range of between 36-45 degrees, for example, based on the characteristics of the physical setting. As a result, the display placement values are determined to satisfy the display placement criterion based at least in part on viewing angle 218 being within the recommended viewing angle range.

In some examples, the one or more display placement values may be determined to satisfies a display placement criterion on the basis that the display placement values are substantially similar to model placement values (e.g., within 90% of specific model characteristics). For example, based on the characteristics of the physical setting, the media delivery model may indicate that model size parameters include a virtual display screen size corresponding to a 60 inch cross-sectional length (e.g., the wall characteristics are not suitable for a larger display screen size). The display size parameters 216 may correspond to a 57 inch cross-sectional length. Based on the determination that the 57 inch cross-sectional length is within 90% of the 60 inch cross-sectional length model characteristic, the display size parameters may be determined to satisfy the respective display placement criterion. In some examples, the display center position 214 and display size parameters 216 may be determined to satisfy a display placement criterion on the basis that one or more user preferences or settings are satisfied, as discussed in more detail with respect to FIGS. 3A-C.

With reference to FIG. 2C, in accordance with a determination that the at least one display placement value satisfies a display placement criterion, a virtual display 220 may be displayed within XR setting 202. Virtual display 202 may be displayed at the fixed boundary location corresponding to the physical setting of the user, such as the fixed boundary location determined by the media delivery model. For example, a center of the fixed boundary location may correspond to display center position 214 determined by the media delivery model. The fixed boundary location may correspond to a location on wall representation 210, such that the resultant images displayed to the user resemble the physical setting including a display mounted to or otherwise attached to the physical wall corresponding to wall representation 210. In this example, representations of various physical objects located in the physical setting, such as chair representation 204 and table representation 206, remain displayed in XR setting 202. As a result, the only substantial difference in appearance between the user view of the actual physical setting and the displayed images resembling the physical setting is virtual display 220.

Figure 3A:
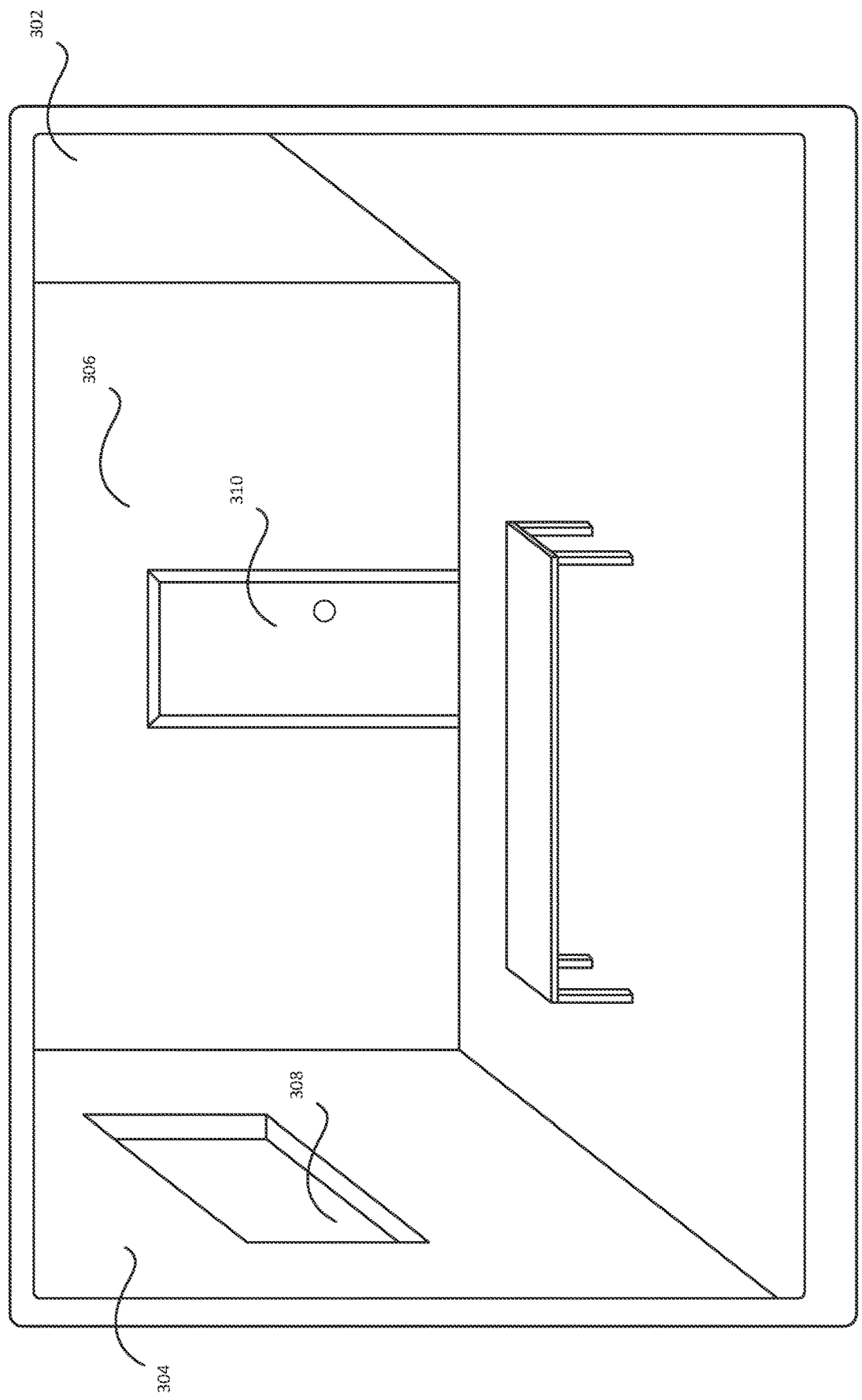
FIGS. 3A-3C depict an exemplary process for displaying a virtual display.
Figure 3B:
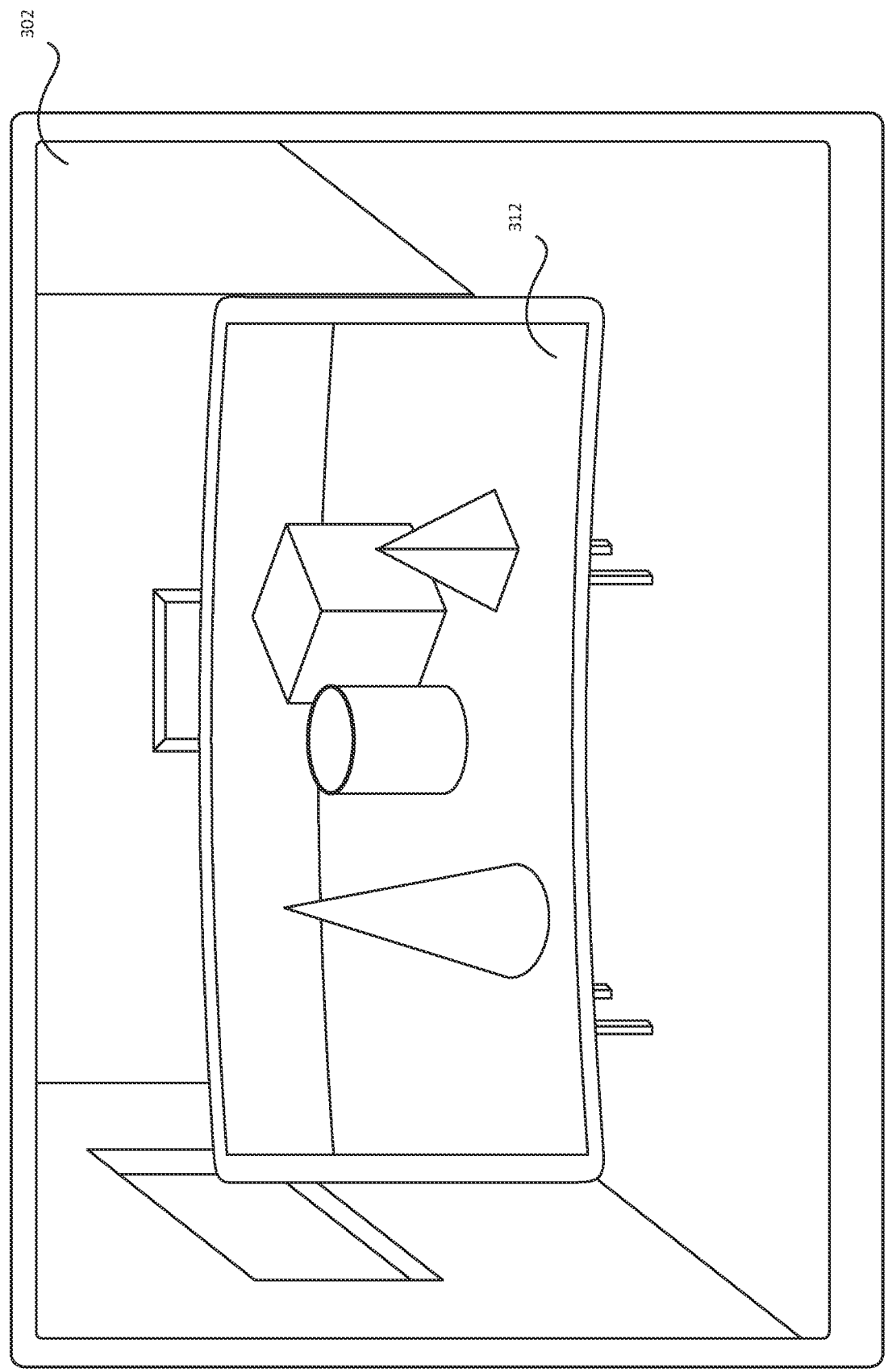
Figure 3C:
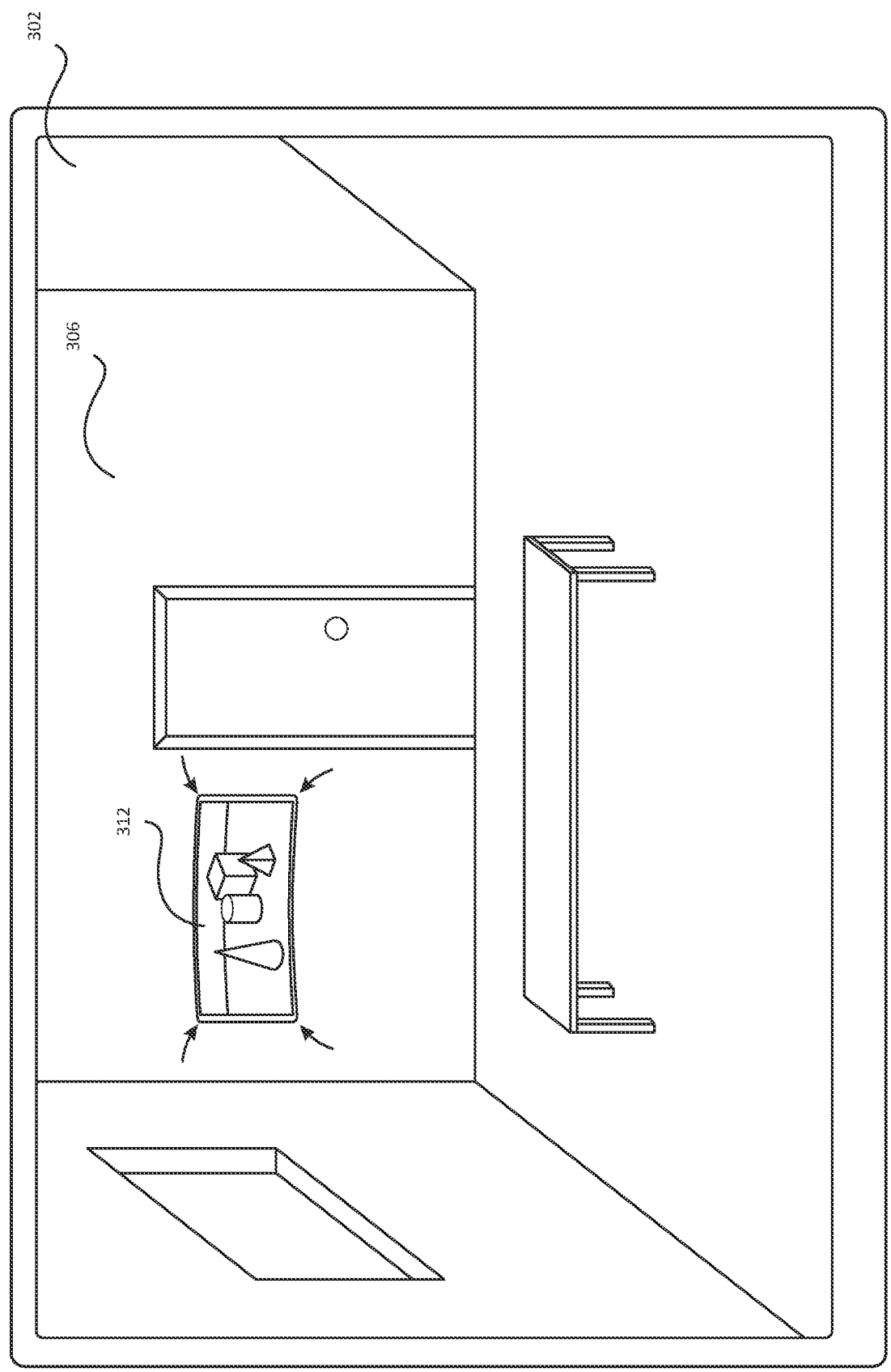

FIGS. 3A-3C depict an exemplary process for displaying a virtual display in an XR setting. With reference to FIG. 3A, the electronic device may display XR setting 302, which may include wall representation 304 and wall representation 306. Wall representation 304 may further include a window representation 308, and wall representation 306 may further include door representation 310. A set of parameters corresponding to characteristics of the physical setting represented by XR setting 302 may be obtained and provided to a media delivery model. The media delivery model may in turn provide a result including one or more display placement values. In this example, a determination is made that the at least one display placement value does not satisfy a display placement criterion. Specifically, the result received from the media delivery model may indicate that no suitable location exists in the physical setting for placing a display. The indication may be based at least in part on the user's viewing perspective, as depicted from XR setting 302. In some examples, the result may indicate that no suitable boundary exists within a predefined distance from the user's viewing perspective. The user may be positioned approximately 30 feet away from the wall corresponding to wall representation 306, and the predefined distance may correspond to 15 feet, for example. In this example, the determination that the at least one display placement value does not satisfy a display placement criterion corresponds to the determination that the user is positioned farther than the predefined distance away from any respective wall.

In some examples, the result may indicate that wall representation 304 does not include a minimum display area for a display of a minimum size (e.g., a 30 inch cross-sectional display). This indication is provided at least on the basis of a detected boundary obstruction, such as the respective physical wall (corresponding to wall representation 304) including a window (corresponding to window representation 308). Similarly, the result may indicate that wall representation 306 does not include a minimum display area for a display of a minimum size, based at least in part on a detected boundary obstruction related to a door (corresponding to door representation 310). In some examples, one or more settings may indicate that obstructions (e.g., doors, windows, fixtures, or other objects) are to be ignored when determining whether display placement values satisfy a display placement criterion. As a result, a virtual display may ultimately be displayed at a fixed boundary location as covering or partially covering a boundary obstruction, such as covering window representation 308 or door representation 310.

With reference to FIG. 3B, in accordance with a determination that the at least one display placement value does not satisfy a display placement criterion, virtual display 312 is displayed in XR setting 302 at a fixed location corresponding to a predefined distance in front of the user in the physical setting. Virtual display 312 being placed a fixed location may result in the appearance of a "floating" display within XR setting 302. In some examples, the predefined distance in front of the user may be obtained directly (or derived) from one or more standards including specifications for a desirable display placement. The predefined distance may further be created, modified, or otherwise customized by a user. Additionally, the predefined distance may in part be based on the environmental characteristics of the user, such as the distances between the user's viewing perspective and various walls or other boundary locations of the physical setting. In particular, the predefined distance may correspond to several feet in front of the user. Alternatively, the predefined distance may correspond to 10, 20, or 30 (or greater) feet in front of the user when the user is in an open environment outdoors, for example. The size of virtual display 312 may also depend on the environmental characteristics of the user and the fixed location corresponding to a predefined distance in front of the user. For example, when the predefined distance in front of the user is relatively shorter (e.g., the virtual display is displayed as floating several feet in front of the user), the virtual display may be depicted as having a relatively smaller size, such as a 26 inch cross-sectional length. Alternatively, when the predefined distance in front of the user is relatively longer (e.g., the virtual display is displayed as floating 20 feet or more in front of the user), the virtual display may be depicted as having a relatively larger size, such as a 100 inch cross-sectional length.

Virtual display 312 may additionally be displayed as "always in front of" or "following" the user. For example, when the user moves about XR setting 302, or otherwise modifies a head direction (e.g., looks up or down), the virtual display 312 may be displayed in the same position and distance in front of the user. Virtual display 312 may move closer or farther to the user depending on any detected obstruction during the user's movements or head direction changes. For example, if the user moves towards and close to a wall representation, virtual display 312 may also move closer to the user. In particular, for example, virtual display 312 may be displayed as contacting and attaching to a wall representation while the user moves toward the wall, if the virtual display 312 would otherwise be displayed as overlapping or moving through the wall representation. Alternatively to being displayed as "always in front of" the user, virtual display 312 may be displayed in a static position within XR setting 302, despite user movements within XR setting 302. For example, after virtual display 312 is initially displayed in XR setting 302, any user head movements or other movements within XR setting 302 will result in virtual display 312 maintaining the initial position. In particular, after virtual display 312 is displayed and positioned, if the user's head turns upward and the user perspective gradually focuses upward in XR setting 302, the virtual display may be displayed as moving downward along with the XR setting 302. Similarly, after the virtual display is displayed and positioned, if the user moves past virtual display 312 within XR setting 302 (e.g., the user performs a movement function towards wall representation 306 and beyond the fixed position of virtual display 312), virtual display 312 may be displayed as moving toward the user in XR setting 302, and eventually displayed as moving out of the user's field of view in XR setting 302.

With reference to FIG. 3C, a user input may be detected, the user input corresponding to an intent to adjust the virtual display within the XR setting. The user input may include one or more inputs from a controller, a detected user gaze, a speech input, and the like. For example, the user may operate one or more controllers to control one or more virtual hands within XR setting 302. In particular, the user may provide one or more inputs to take control of the position of virtual display 312 (e.g., a finger pinch or predefined button while a cursor is positioned on the virtual display, etc.), and further provide one or more inputs to move virtual display 312 within XR setting 302 (e.g., extending the controller away from the user). In accordance with a determination that the intent to adjust the virtual display includes an intent to move the virtual display, such as a finger pinch and a controller extension, virtual display is displayed as moving to an alternative location within XR setting 302. As shown in FIG. 3C, for example, the user may move virtual display 312 towards wall representation 306. In some examples, upon a detection that the user has moved the virtual display towards a position consistent with a boundary in the XR setting, the virtual display may attach or otherwise become coupled to the boundary once the user releases control of the virtual display. Virtual display 312, for example, is shown as attached to wall representation 306. In some examples, if no boundary location in the XR setting is detected proximate to virtual display 312 once the user releases control of the virtual display, virtual display 312 may be depicted as "floating" at the fixed position within XR setting 302, as discussed with respect to FIG. 3B. The user input may additionally include a speech input to control movement of the virtual display. For example, the user may utter a predefined spoken trigger, followed by a command, such as "OK system, move the display to the center of that wall." The speech input may be supplemented with additional inputs, such as a controller input signifying a location of a wall representation within XR setting 302. As a result, an ambiguous term such as "that wall" may be disambiguated based on the additional information including the controller inputted location of a wall representation.

Additionally, in accordance with a determination that the intent to adjust the virtual display includes an intent to modify a size of the virtual display, a size modification of the virtual display is displayed. In this regard, the user may additionally provide one or more inputs in order to signify an intent to resize virtual display 312 within XR setting 302. For example, the user may provide inputs to take control of two corners of virtual display 312 (e.g., a finger pinch or predefined button while a cursor is positioned on the virtual display, etc.), followed by a gesture movement to shrink the size of the display (e.g., moving the user's hands together or apart while the inputs are activated). The user may also utter a predefined spoken trigger, followed by a command, such as "OK system, shrink this by 20%." The speech input may be supplemented with additional inputs, such as a gaze input corresponding to the user looking directly at virtual display 312 within XR setting 302. As a result, an ambiguous term such as "this" may be disambiguated based on the additional information including an object in XR setting 302 associated with the user's gaze.

FIGS. 4A-4B depict an exemplary process for displaying a virtual display in a virtual room within an XR setting. With reference to FIG. 4A, the electronic device may display XR setting 402, which may include wall representation 404, chair representation 406 and table representation 408. In some examples, one or more virtual space preferences are detected. In particular, a virtual space preference may indicate a user preference, system setting, or other parameter signifying a preference to display a virtual display within a virtual room in the XR setting. For example, the user may customize predefined user preferences to signify such preference, or may provide a speech input such as "OK system, load the movie theatre." In accordance with detecting a virtual space preference, at least one boundary corresponding to the physical setting is identified. The one or more boundaries may be identified based on various factors, such as a desirable boundary location to place a virtual display. As an example, the boundary may be identified at least in part based on the result obtained from the media delivery model, such as obtained directly (or derived) from one or more standards including specifications for a desirable display placement. The boundaries may be identified based on the largest determined boundary (e.g., the largest wall in the physical setting), a user preference (e.g., the user previously selected a specific wall as a replacement with a virtual room), etc. In this example, wall representation 404 may be identified in accordance with detecting the virtual space preference.

With reference to FIG. 4B, a virtual room 410 may be displayed which at least partially replaces, in XR setting 402, a representation of the at least one boundary, such as wall representation 404. The replacement or partial replacement of the boundary representation may further include replacing or partially replacing one or more objects or other boundaries in XR setting 402. For example, table representation 408 may be removed as a representation in XR setting 402 based at least in part on a determination that the representation obstructs a view of virtual room 410 or is otherwise overlapping in display with virtual room 410. As a result, while the physical setting includes a physical table associated with table representation 408, the XR setting no longer includes table representation 408. Upon displaying virtual room 410, virtual display 412 is further displayed as positioned within virtual room 410. In some examples, the displayed brightness or other lighting characteristics of virtual room 410 is displaying as matching or substantially matching the detected brightness of the physical setting. As a result, the displayed brightness of virtual room 410 matches or substantially matches the displayed brightness of the remainder of XR setting 402.

In some examples, one or more boundaries corresponding to the physical setting may be identified, such that a virtual room or other virtual space is displayed as at least partially replacing the identified boundaries. Such replacement may occur with or without detecting a virtual space preference. For example, in accordance with detecting that at least one light parameter exceeds a threshold, a virtual sky is displayed in the XR setting. The light parameter exceeding a threshold may correspond to one or more of a time of day parameter exceeding a time of day threshold (e.g., after 5 PM and before 5 AM), a room brightness exceeding a brightness threshold (e.g., physical setting is associated with a low radiance value), a sun position exceeding a positional value (e.g., sun is set at the current location), a user preference, and the like. In this example, the virtual sky may at least partially replace, in the XR setting, a representation of at least one ceiling boundary corresponding to the physical setting. The virtual sky may be depicted as an evening sky, a morning sky, a sky consistent with the physical sky at the current location, and the like.

Figure 5B:
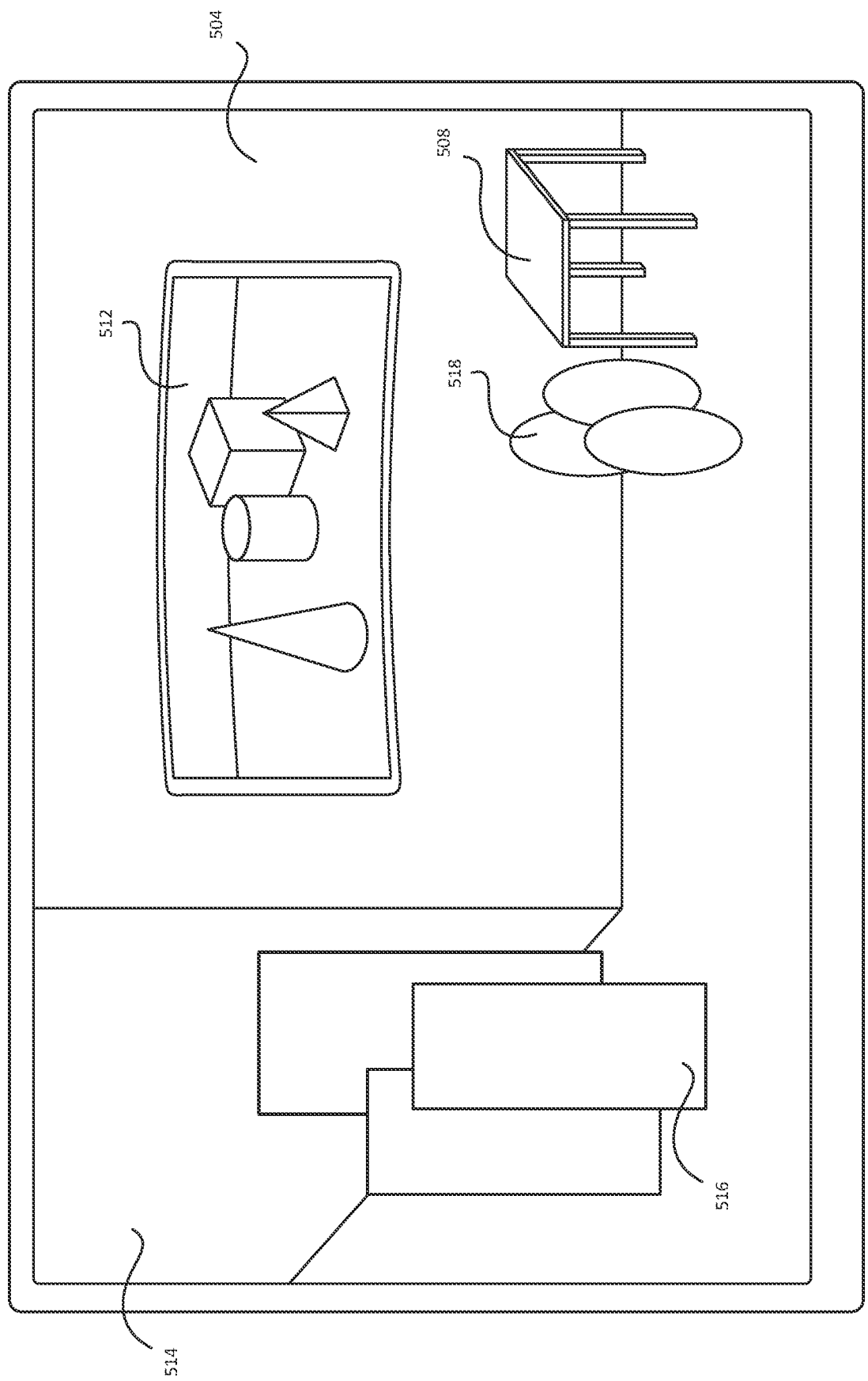

FIGS. 5A-5B depict an exemplary process for displaying virtual objects associated with displayed media on a virtual display. In reference to FIG. 5A, the electronic device may display XR setting 502, which may include wall representation 504, chair representation 506, table representation 508, and wall representation 510. As shown in FIG. 5B, a virtual display 512 may be displayed within XR setting 502, and in particular as attached to wall representation 504. In this example, various virtual spaces may at least partially replace various boundary representations upon display of virtual display 512. For example, at least one boundary corresponding to the physical setting is identified (e.g., a large wall to the left or right of a user's perspective). A virtual space 514 may be displayed, including virtual objects 516, where virtual space 514 fully replaces wall representation 510. Various object representations may also be fully or partially replaced by virtual spaces and/or virtual objects, such as chair representation 506 being fully replaced by virtual space 514. In particular, virtual space 514 may resemble an additional room (including virtual objects 516) within XR setting 502. Virtual space 514 may also be displayed as partially replacing a portion of wall representation 504. Various object representations may be maintained in XR setting 502, such as table representation 508. Other virtual objects may be displayed as overlaid on representations of the physical setting. For example, one or more virtual objects 518 may be displayed underneath the virtual display 512, such as next to table representation 508 and as resting on the floor representation.

Virtual spaces and virtual objects may correspond to the currently displayed content on virtual display 512. In some examples, attributes associated with displayed media are identified, where at least one virtual object and/or virtual space is displayed based on the identified attributes. For example, the user may be viewing a medieval-themed movie on virtual display 512, such that attributes related to castles, sailing ships, knights, and royalty are identified. Based on the identification, virtual space 514 may correspond to the representation of a king's throne room based on the identification of castle and royalty attributes. Virtual objects may correspond to various representations of knight statues, or knight characters associated with the medieval-themed movie.

In some examples, the displayed media may be associated with interactive virtual objects. In particular, a user input corresponding to an interaction with virtual display 512 may be detected. The user may interact with one or more controllers to move a cursor or other indicator proximate or adjacent to various media items displayed on virtual display 512 in XR setting 502. Once the cursor or indicator is positioned proximate or adjacent to one or more media items, the user may provide an additional input (e.g., a finger pinch or predefined button while a cursor is positioned on the virtual display, a speech input, etc.) in order to activate the one or more media items. For example, various pieces of knight armor may be displayed on virtual display 512, such that the user positions a cursor or indicator on a piece of knight armor and activates the knight armor. In accordance with a determination that the user interaction is associated with an interactive virtual object, such as the knight armor, the virtual object is displayed in XR setting 502. Virtual objects 518, for example, may be displayed as a result of a user interaction with virtual display 512. In particular, the user may interact with the piece of knight armor displayed on virtual display 512, such that the knight armor is depicted as emerging from virtual display as a virtual object 518 within XR setting 502. Once the virtual object 518 is displayed in XR setting 502, the user may further interact with virtual object 518 based on one or more user inputs as described herein (e.g., move the virtual object within XR setting 502). The user may additionally provide one or more inputs to gain additional information about the virtual item (e.g., a specific controller input). Such inputs may result in the display of a user interface with text about the virtual object, an audio prompt with audio about the virtual object, and the like.

FIG. 6 depicts an exemplary adjustment of the curvature of a virtual display. In general, the curvature of a virtual display within an XR setting may depend on the distance between the position of the user's perspective and the surface of the virtual display (e.g., a center point of the virtual display). For example, when the virtual display is positioned at a fixed point within the XR setting (e.g., displayed as attached to a boundary location, displayed as fixed within space, etc.), the user perspective in the XR setting may be changed such that the virtual display appears closer or farther from the user than in the original perspective. In particular, in accordance with a determination that the user head movement corresponds to movement away from the virtual display, the curvature of the virtual display is decreased, whereas in accordance with a determination that the user head movement corresponds to movement towards the virtual display, the curvature of the virtual display is increased. As an example, a first user perspective may be associated with a perspective position 602, and such that a distance between the perspective position 602 and a center point of virtual display 606a corresponds to a first distance 604 (e.g., 10 feet within the XR setting). The user may make one or more head movements or other movements changing the user's perspective within the XR setting. For example, the user may recline or otherwise perform a backwards head movement, resulting in a greater distance 608 between the perspective position 602 and a center point of the virtual display (e.g., 12 feet within the XR setting). In particular, distance 608 is larger than distance 604. As a result, the curvature of virtual display may decrease, resulting in the resemblance in the XR setting of a "flatter" virtual display 606b than the resemblance of virtual display 606a. As another example, the user may lean forward or otherwise perform a forward head movement, resulting in a shorter distance 610 between the perspective position 602 and a center point of the virtual display (e.g., 8 feet within the XR setting). In particular, distance 610 is smaller than distance 604. As a result, the curvature of the virtual display may increase, resulting in the resemblance, in the XR setting, of a more curved virtual display 606c than the resemblance of virtual display 606a.

The curvature of the virtual display may be limited by one or more threshold curvatures. In general, in accordance with a determination that the curvature of a virtual display is below a threshold minimum curvature, the curvature of the virtual display is maintained at the threshold minimum curvature, whereas in accordance with a determination that the curvature of the virtual display is above a threshold maximum curvature, the curvature of the virtual display is maintained at the threshold maximum curvature. The minimum and maximum threshold curvatures may further depend on the displayed size of the virtual display. For example, a minimum threshold curvature may correspond to no curvature, or a small curvature in the context of displays (e.g., corresponding to a curved display radius of 10 m).

Once the user's perspective is positioned substantially far from the virtual display (e.g., 30 feet within the XR setting), the curvature will be maintained at the minimum threshold curvature and will not change if the user maintains the viewing perspective or the viewing perspective moves further from the virtual display. Similarly, a maximum threshold curvature may correspond to a relatively large curvature in the context of displays (e.g., corresponding to a curved display radius of 10 m). Once the user's perspective is positioned substantially close to the virtual display (e.g., 1-2 feet within the XR setting), the curvature will be maintained at the minimum threshold curvature and will not change if the user maintains the viewing perspective or the viewing perspective moves closer to the virtual display.

The orientation of the virtual display may change based on certain user movements, such as lateral movements within the physical setting. For example, a virtual display may be displayed as "floating" in front of the user or otherwise mounted on a surface in front of the user in the XR setting. If the user takes several steps to the left or right in the physical setting, the orientation of the virtual display may be displayed as gradually turning towards the user (e.g., the orientation of the virtual display changes in proportion to the user's lateral movement), such that the front of the virtual display is depicted as facing the user or otherwise tilted towards the user. For instance, if the user takes several steps to the left, and turns their head right (e.g., back towards the virtual display), the virtual display may be depicted as turned towards the user, such that the user has a better viewing angle to view the virtual display than if the virtual display had retained the initial orientation prior to the user performing the lateral movement.

In some examples, the audio corresponding to media playing on the virtual display is output based on characteristics of the physical setting. When a user is viewing media on the virtual display in the XR environment, the virtual audio sources corresponding to the displayed media may be positioned near the virtual display, such that the user perceives the audio as coming from the virtual display in the XR setting. In particular, characteristics of the physical setting, such as room size and shape, may generally have an effect on audio that is output from various sources within the physical setting (e.g., speakers, humans, animals, etc.). In some examples, the result from the media delivery model includes an audio rendering setting, where the audio rendering setting indicates how to output the audio associated with displayed media. When the result includes an audio rendering setting, audio output parameters included in the result may indicate how to customize the audio output based on the physical setting. If the user is situated in a relatively smaller room, the audio output characteristics may reflect audio output settings consistent with the smaller room. For example, if the user is situated in close proximity to a wall and various pieces of furniture surround the user, the audio output to the user may include various reverberations consistent with audio reflecting off the wall and furniture. The result from the media delivery model may alternatively not include an audio rendering setting. In this case, audio may be output based on the default audio parameters, such as obtained directly (or derived) from one or more standards including specifications for a desirable audio output based on display placement. For example, audio output consistent with default audio parameters may resemble desirable or otherwise model audio output regardless of the physical setting characteristics (e.g., audio output in a theater setting).

Audio output based on media displayed on the virtual display may also vary according to user movement within the physical setting. A virtual display may be depicted in the XR setting as attached to a center portion of a wall. As an example, the audio output parameters may be adjusted based on user movement from a right side of the center portion to a left side of the center portion. In particular, when the user is situated at the right side of the center portion, the audio output parameters may be set such that audio associated with the user's left ear has higher volume than audio associated with the user's right ear (e.g., the sound is perceived by the user to come from the virtual display, which is positioned to the left of the user in the XR setting). When the user moves in the physical setting to the left side of the center portion, the audio output parameters may be adjusted such that audio associated with the user's right ear has higher volume than audio associated with the user's left ear (e.g., the sound is perceived by the user to come from the virtual display, which is now positioned to the right of the user in the XR setting). The adjustment of the audio output parameters may be contemporaneous with the user moving about the physical setting, such that the audio output (based on the adjusted parameters) is adjusted dynamically as the user moves within the physical setting.

In general, audio output may include various transitional effects based on specific conditions, such as the virtual display being displayed, media playback on the virtual display, the user looking at or away from the virtual display, and the like. The transitional effects may be provided via headphones worn by the user of the electronic device, for example. In particular, audio transparency and active noise control may be utilized when providing audio based on playing media. For instance, when using audio transparency, a first audio output is provided to the user, such as audio corresponding to environmental sounds of the physical setting received at the electronic device (e.g., received at one or more microphones coupled to the device). Based on media playback, a second audio output is provided to the user, such as sound corresponding to a movie currently playing on the virtual display. The first audio output may be continually provided to the user throughout the duration of the media playback, with the volume level of the first audio output being reduced while the media is playing and/or while the virtual display is being displayed. The volume level of the first audio output may then be raised back to an original level once the media stops playing and/or when the virtual display is no longer displayed. Similarly, the second audio output may be provided upon initiating media playback on the virtual display. This second audio output is no longer provided once the media stops playing on the virtual display and/or when the virtual display is no longer displayed. The volume levels corresponding to the environmental sound and the media playback sound may be based on predefined volume levels, such as those defined in user preferences. For example, a user may configure a predefined environmental volume to be set at 80% of the actual environmental sound level while media is not playing on the virtual display, and may configure a predefined environmental volume be set at 10% of the actual environmental sound level while media is playing on the virtual display. Likewise, the user may configure a predefined media playback volume to be 90% of the volume at which the media is mastered, as an example.

In some examples, when using active noise control, a third audio output including a noise control signal is applied to the first audio output in specific situations. As the virtual display is initiated and media begins to play back on the virtual display, for instance, the second audio output associated with the playing media is provided. While initiating the virtual display and media playback, a noise cancellation level associated with the noise control signal may be gradually increased, such that the noise level of the environmental sound is gradually reduced as the virtual display is being displayed. Once the virtual display is displayed and while the media is playing, the third audio output continues to be provided in order to suppress noise from the environmental sound. In particular, one or more settings, such as a user preference, may indicate one or more noise cancellation levels. These levels may include predefined noise cancellation level when media is playing (e.g., 100% noise cancelling, 80% noise cancelling, etc.), a predefined duration by which noise cancelling transitions from "off" to the present noise cancellation level (e.g., three seconds, five seconds, etc.), other conditions when noise cancellation should not be employed, and the like.

Volume adjustment and noise control may be performed based on factors such as headset orientation, user head movements, user gaze, and the like. In particular, whether a user is looking towards or away from a virtual display may influence the volume adjustments and noise control. As an example, in accordance with detecting a user gaze moving away from the virtual display, the volume of the environmental sound may be raised, whereas the volume of the playing media may be lowered. Similarly, in accordance with detecting a user gaze towards the virtual display, the volume of the environmental sound may be lowered, whereas the volume of the playing media may be raised. These adjustments may be made in proportion to the movement, such that if the user gaze and/or head movement momentarily stops, the volume levels are momentarily maintained at the current volume level. The noise cancellation level may also be raised in proportion to a user gaze towards the virtual display, whereas the noise cancellation level may be lowered in proportion to a user gaze away from the virtual display. In addition, the above adjustments may only be made when media is playing on the virtual display, or may be made regardless of whether media is playing on the virtual display.

In general, volume adjustment and noise control may be performed in proportion to other outputs associated with the physical setting, such as brightness levels. As discussed herein, initially, a brightness level of the physical setting representation may be consistent with the brightness level of the actual physical setting. Once media is displayed on the virtual display for example, the brightness level of the physical representation may be lowered to a predetermined brightness level. While the brightness level of the physical representation is being lowered, the volume level associated with the environmental sound may be gradually lowered in proportion to the brightness level being lowered. Likewise, the volume level associated with the media playing may be gradually raised in proportion to the brightness level being lowered. The noise cancellation level may also be raised in proportion to the brightness level being lowered, and similarly, the noise cancellation level may be lowered in proportion to the brightness level being raised.

Various additional conditions may influence the audio rendering. In general, certain situations may arise such that the user may be interested in at least partially hearing environmental sounds associated with the physical setting. For safety reasons, noise control and the volume reduction of the environmental sound may be forgone under certain conditions, such as specific environmental sound detected in the first audio output. Such sound may correspond to various conditions, such as fire alarms, tornado sirens, amber alerts, user device alarms, emergency broadcasts, or other sounds associated with dangerous situations. Other detections may also cause noise control and volume reduction to be forgone. For instance, sounds detected from specific entities, such as specific persons (e.g., a roommate of the user) or devices (e.g., a home speaker in the physical setting), may cause the volume reduction and noise control to be forgone. Such entities may be defined in user preference data, default device settings, and the like. When such conditions are detected, various audio outputs may cease to be provided, or the volume levels of such signals may be raised or lowered. In particular, the audio output corresponding to playing media and noise control may be forgone in response to such conditions. In some examples, in response to such conditions, the volume level associated with the physical setting may be raised, the volume level associated with playing media may be lowered, and/or the noise cancellation level may be lowered. The various audio outputs and volume levels may be restored to originals levels once the condition is no longer occurring (e.g., an alarm is no longer detected).

Media content may also influence audio rendering. For instance, media content associated with specific environmental conditions may influence the volume and noise control levels. As an example, the user may be viewing media content on the virtual display including a transition between an above-water scene and an underwater scene. At the point in the scene where the transition to the underwater environment occurs, the volume level corresponding to the physical setting may be reduced, and the noise cancellation increased, in order to provide an audible perception of going under water. Similarly, the user may be viewing media content including a scene in outer space. At the point in the scene of the transition from the space environment to a non-space environment (e.g., transitioning back to Earth), the volume level of the physical environment may be increased, and the noise cancellation decreased, in order to provide an audible perception of transitioning from an outer space environment to a conventional environment.

Adjustment of the volume levels may be performed using headphones worn by the user of the head-mounted device, and/or may be performed using one or more speakers external to the head-mounted device (e.g., one or more home speakers). In the case of one or more external speakers performing volume adjustment, the external speakers may utilize spatial audio techniques in response to various detected conditions. For example, while initiating display of the virtual display, a spatial audio mode of the external speakers is also initiated. Initiating spatial audio may include providing spatially oriented audio associated with playing media, and further placing virtual sound sources at specific virtual locations corresponding to the respective physical setting. The position of the virtual sound sources may provide the user with the perception that sound is emanating from the corresponding position in the physical setting, such as above, below, behind, and/or to the sides of the user. The spatially oriented audio may be specifically tailored to account for such sound localization (e.g., based on a head-related transfer function). Such audio may continue to be provided so long as the virtual display is displayed and/or media is playing on the virtual display.

As discussed above, various brightness levels of the physical setting representation may be adjusted based on certain factors. In some examples, prior to displaying a virtual display (or prior to displaying media on a displayed virtual display), a brightness level of the physical setting representation in an XR setting may be consistent with the brightness level of the actual physical setting. Once media is displayed on the virtual display, for example, the brightness level of the physical representation may be lowered to a predetermined brightness level. As a result, the appearance of the physical setting in the XR setting may resemble the lights dimming in the user's environment upon the playback of media. In some examples, user head movements relative to the virtual display may affect the displayed brightness of the physical setting representation. A user gaze direction may first be determined (e.g., a user may be looking at or towards the virtual display in the XR setting). In accordance with detecting a user head movement and a movement of the user gaze direction away from the virtual display (e.g., the user's head turns and looks away from the virtual display in the XR setting), the brightness level associated with the physical setting may be raised. Similarly, in accordance with detecting a user head movement and a movement of the user gaze direction towards the virtual display (e.g., the user's head turns back and looks towards the virtual display in the XR setting), the brightness level associated with the physical setting may be lowered. As a result, the user may view various content within the physical setting representation when looking away from the virtual display based on the raised brightness level.

In some examples, the brightness level of the physical representation may be modified based on various media control inputs. The user may provide a media control input in order to interrupt playback of displayed media on the virtual display, such as a pause function, rewind function, fast forward function, and the like. In accordance with detecting a pause function, for example, the brightness level of the physical representation may be raised. The brightness level of the physical representation may then be lowered or otherwise returned to the previous brightness level in accordance with detecting a play function, for example. The brightness level of the physical setting representation may also dynamically correspond to media being displayed on the virtual display. In particular, in accordance with a brightness level increase in the displayed media (e.g., an explosion occurs in a movie displayed on the virtual display), the brightness level of the physical setting representation may increase in proportion to the increase of the brightness level of the displayed media. Similarly, in accordance with a brightness level decrease in the displayed media (e.g., the virtual display momentarily displays a black or otherwise dark screen), the brightness level of the physical setting representation may decrease in proportion to the decrease of the brightness level of the displayed media.

In some examples, one or more visual characteristics of the physical setting may be modified based on user movements. For example, the user may be looking away from the virtual display within the XR setting, such as looking to the left of the virtual display at a 90 degree angle. In accordance with detecting movement of the user gaze towards the virtual display, the brightness level of the physical setting representation may decrease proportional to the gaze movement. For example, as the user makes a head movement to the right and towards the virtual display, the depicted brightness level of the physical setting may decrease, such that the brightness level of the physical setting is dark when the user is looking directly at the virtual display in the XR setting. In some examples, virtual content is gradually displayed in the XR setting based on user movements. The user may be looking away from the virtual display within the XR setting, such that when the user looks back towards the virtual display, virtual content gradually appears proximate to the virtual display as the user looks towards the display. For example, the virtual display may be displaying an outer space themed movie, such that a number of virtual objects related to outer space (e.g., spaceships, planets, asteroids, etc.) may be gradually displayed within the XR setting as the user looks towards the virtual display in the virtual setting.

In some examples, the appearance of the physical setting may gradually change and be replaced with a virtual setting as the user looks towards the virtual display. For example, the appearance of the physical wall and the physical floor may be replaced with an appearance resembling outer space (e.g., stars surrounded by darkness) as the user looks towards the virtual display. Based on a user preference or other parameter, the user may additionally utilize a "night sky" mode, such that when the user reclines and looks upward, the virtual display is depicted along with a virtual setting replacing the physical setting. For example, the representation of the ceiling of the physical setting and surrounding walls of the physical setting may be replaced with a virtual setting resembling a night sky. As a result, the virtual display may be depicted as "floating" above the user in front of a night sky while the user maintains the reclined position. When the user returns to an upright position, for example, the virtual setting resembling the night sky may be gradually replaced with the representation of the physical setting (e.g., continually replaced as the user returns to the upright position).

The amount of modification to the physical setting representation may be proportional to user movements. For example, if the user is facing away from the virtual display and turns slightly towards the virtual display, the brightness of the physical setting representation may be slightly adjusted (e.g., slightly dimmed), and/or a small amount of virtual content may replace a small amount of the physical setting representation. If the user is initially facing away from the virtual display and turns towards the virtual display such that the gaze of the user is ultimately looking directly at the virtual display, the brightness of the physical setting representation may be substantially adjusted (e.g., from a normal room brightness to a dark room brightness), and/or large amount of virtual content may replace a large amount of the physical setting representation (e.g., the wall, floor, and additional area surrounding the virtual display). The changes in the physical setting representation may also be depicted gradually, such that the change in appearance is not disturbing or otherwise disruptive to user experience. For example, the changes in the physical setting representation may occur at the edges of the user's field of view as the user changes a viewing position, in order to minimize abrupt changes in foreground of the user's viewing perspective. In some examples, if the user makes a sudden movement (e.g., a quick head movement from left to right), any change in the physical setting to adjust brightness or display virtual content may slowly occur once the user gaze direction has stabilized for a predetermined period of time (e.g., several seconds).

Modifying the appearance of the physical setting may include various display-specific processes to adjust or otherwise modify characteristics of the display being viewed by the user. For example, the user may view the physical setting using an opaque display, such that a representation physical setting is displayed to the user via one of more cameras in communication with the display. In this example, the representation of the physical setting may be modified such that certain portions of the representation are modified (e.g., a representation of an area around a display is modified to include virtual content), brightness levels of the representation are adjusted, and the like. Alternatively, the user may view the physical setting using an additive display, such that the user views the actual physical setting through transparent layers (e.g., a glass layer, a polymer layer, etc.). When modifying the appearance of the physical setting using the additive display, various additional display layers may be utilized to modify respective portions of the physical setting appearance. The additional display layers may include one or more of a liquid crystal display (LCD) layer, a light-emitted diode (LED) layer, organic light emitting diode (OLED) layer, and the like. For example, when modifying a brightness level of the physical setting appearance, a brightness level of one or more display layers may be adjusted in order to provide an appearance that the brightness level of the physical setting is being adjusted. Similarly, when displaying virtual content to the user, the one or more display layers may be activated to display the virtual content, while the user is still able to view respective portions of the actual physical setting through the transparent layer. As a result, an appearance is provided resembling the virtual content being situated in the physical setting. In some examples, the virtual content may partially replace or completely replace various physical objects or physical boundaries (e.g., walls) as seen through the transparent layer.

Figure 7:
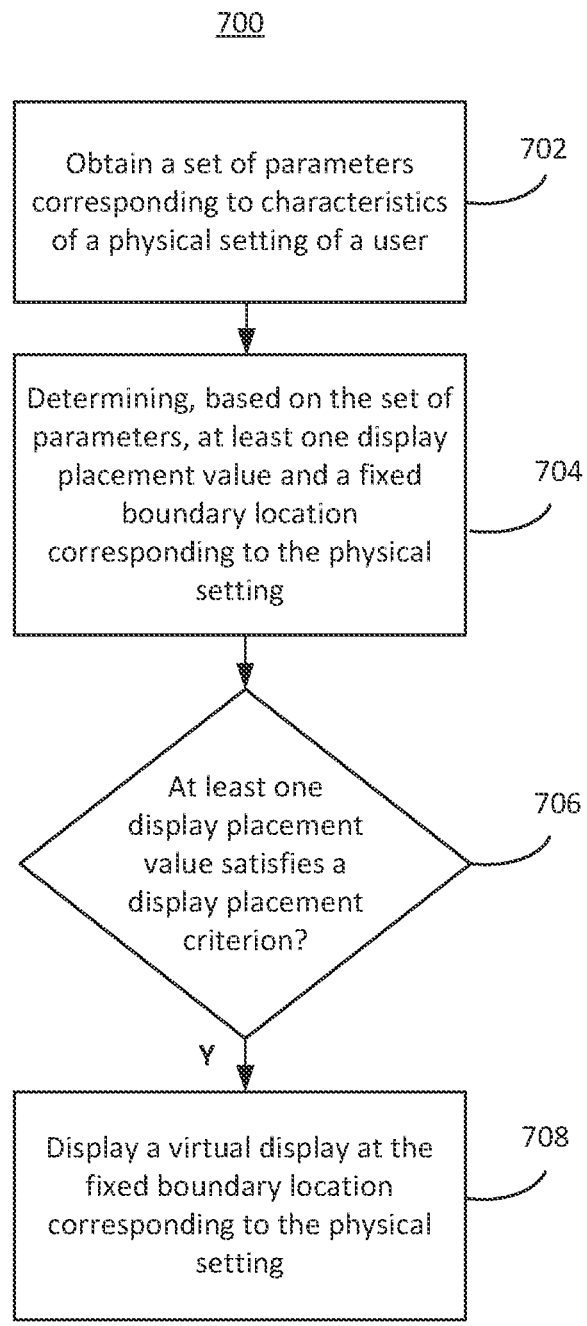
FIG. 7 depicts an exemplary process for displaying a virtual display.

Referring to FIG. 7, a flow chart of an exemplary process 700 for displaying a virtual display in an extended reality setting is depicted. Process 700 can be performed using a user device (e.g., device 100a). For example, the user device may be a handheld mobile device or a head-mounted device. In some embodiments, process 700 is performed using two or more electronic devices, such as a user device that is communicatively coupled to another device, such as a base device. Further, it should be appreciated that the display of the user device can be transparent or opaque. Process 700 can be applied, for example, to extended reality applications, such as virtual reality, augmented reality, or mixed reality applications and to effects that include visible features as well as non-visible features, such as audio, haptic, or the like. Although the blocks of process 700 are depicted in a particular order, it should be appreciated that these blocks can be performed in other orders. Furthermore, one or more blocks of process 700 can be optional and/or additional blocks may be performed.

At block 702, a set of parameters corresponding to characteristics of a physical setting of a user is obtained. At block 704, determination is made, based on the set of parameters, of at least one display placement value and a fixed boundary location corresponding to the physical setting. In some examples, the set of parameters is provided to a media delivery model. In some examples, a result is received from the media delivery model based on the provided set of parameters, wherein the result includes the at least one display placement value and the fixed boundary location corresponding to the physical setting. At block 706, a determination is made whether at least one display placement value satisfies a display placement criterion.

At block 708, in accordance with a determination that the at least one display placement value satisfies a display placement criterion, a virtual display is displayed. The virtual display may be displayed at a fixed boundary location corresponding to the physical setting, wherein the result includes the fixed boundary location. In some examples, a user input is detected, the user input corresponding to an intent to adjust the virtual display within the augmented reality setting. In accordance with a determination that the intent to adjust the virtual display includes an intent to move the virtual display, movement of the virtual display is displaying movement including movement of the display to an alternative location within the augmented reality setting. In accordance with a determination that the intent to adjust the virtual display includes an intent to modify a size of the virtual display, size modification of the virtual display is displayed. In some examples, in accordance with detecting a virtual space preference, at least one boundary corresponding to the physical setting is identified. A virtual room may be displayed, wherein the virtual room at least partially replaces a representation of the at least one boundary. In some examples, the virtual display is displayed within the virtual room.

In some examples, in accordance with a determination that the at least one display placement value does not satisfy a display placement criterion, the virtual display is displayed at a fixed location corresponding to a predefined distance in front of the user in the physical setting. In some examples, in accordance with detecting at least one light parameter exceeding a threshold, a virtual sky is displayed, wherein the virtual sky at least partially replaces a representation of at least one ceiling boundary corresponding to the physical setting. In some examples, media is displayed on the virtual display, wherein an attribute associated with the displayed media is identified. At least one boundary corresponding to the physical setting is identified, wherein a virtual room is displayed. In some examples, the virtual room at least partially replaces a representation of the at least one boundary.

In some examples, media is displayed on the virtual display, wherein an attribute associated with the displayed media is identified. In some examples, at least one virtual object is displayed based on the identified attribute. In some examples, a user input corresponding to an interaction with the virtual display is detected, wherein at least one object associated with the displayed media on the virtual display is identified. In accordance with a determination that the interaction is associated with the at least one virtual object, the at least one virtual object is displayed. In some examples, a user head movement is detected, wherein in accordance with a determination that the user head movement corresponds to movement away from the virtual display, a curvature of the virtual display is decreased. In some examples, in accordance with a determination that the user head movement corresponds to movement towards the virtual display, a curvature of the virtual display is increased. In some examples, in accordance with a determination that the curvature of the virtual display is below a threshold minimum curvature, the curvature of the virtual display is maintained at the threshold minimum curvature, wherein in accordance with a determination that the curvature of the virtual display is above a threshold maximum curvature, the curvature of the virtual display is maintained at the threshold maximum curvature.

In some examples, audio associated with media displayed on the virtual display is identified, wherein in accordance with a determination that the result includes an audio rendering setting, audio output parameters are obtained from the result, with the audio output parameters based on the characteristics of the physical setting. The audio is output consistent with the audio output parameters in some examples. In some examples, in accordance with a determination that the result does not include an audio rendering setting, default audio output parameters are obtained. The audio is output based on the default audio output parameters in some examples. In some examples, user movement within the physical setting is identified, wherein the audio output parameters are adjusted based on the user movement within the physical setting. The audio is output consistent with the adjusted audio output parameters in some examples.

In some examples, a representation of the physical setting is displayed in the XR setting, wherein a brightness level of the representation is consistent with a brightness level of the physical setting. In some examples, media is displayed on the virtual display, wherein in accordance with displaying the media on the virtual display, the brightness level of the representation of the physical setting is lowered. In some examples, a user gaze direction is determined and a movement of the user gaze direction is detected. In some examples, in accordance with detecting movement of the user gaze direction away from the virtual display, the brightness level of the representation of the physical setting is raised. In some examples, in accordance with detecting movement of the user gaze direction towards the virtual display, the brightness level of the representation of the physical setting is lowered. In some examples, a media control input is detected, wherein in accordance with the media control input including a pause function, the brightness level of the representation is raised. In accordance with the media control input including a play function, the brightness level of the representation of the physical setting is lowered in some examples. In some examples, a change in the brightness level of the displayed media is detected. In accordance with the change including an increase in the brightness level of the displayed media, the brightness level of the representation is increase in proportion to the increase, wherein in accordance with the change including a decrease in the brightness level of the displayed media, the brightness level of the representation is decreased in proportion to the decrease in some examples.

In some examples, a representation of the physical setting is displayed and media is displayed on the virtual display. In accordance with displaying the media on the virtual display, at least a portion of the representation of the physical setting is replaced with a virtual setting. In some examples, the virtual setting comprises a virtual theatre including the virtual display. In some examples, displaying media on the virtual display comprises commencing playback of the media on the virtual display. In some examples, in accordance with detecting an amount of movement of a user gaze away from the virtual display, at least a first portion of the virtual setting is replaced with a first portion of the representation of the physical setting. In some examples, in accordance with the detected amount corresponding to a first amount, a second portion of the virtual setting is replaced with a second portion of the representation of the physical setting. In some examples, in accordance with the detected amount corresponding to a second amount greater than the first amount, a third portion of the virtual setting is replaced with a third portion of the representation of the physical setting, wherein the third portion is greater than the second portion.

In some examples, in accordance with detecting an amount of movement of a user gaze towards the virtual display, at least a second portion of the representation of the physical setting is replaced with a second portion of the virtual setting. In some examples, in accordance with the detected amount corresponding to a first amount, a second portion of the representation of the physical setting is replaced with a second portion of the virtual setting. In some examples, in accordance with the detected amount corresponding to a second amount greater than the first amount, a third portion of the representation of the physical setting is replaced with a third portion of the virtual setting, wherein the third portion is greater than the second portion. In some examples, while detecting the movement of the user gaze towards the virtual display, the representation of the physical setting is gradually replaced with the virtual setting in proportion to the detected movement of the user gaze towards the virtual display. In some examples, while detecting the movement of the user gaze away from the virtual display, the virtual setting is gradually replaced with the representation of the physical setting in proportion to the detected movement of the user gaze away from the virtual display.

In some examples, a first audio output is provided including audio associated with the physical setting. In some examples, while initiating display of the virtual display, a second audio output is provided including audio associated with media playing on the virtual display, and while displaying the virtual display at the fixed boundary location, the first audio output and the second audio output continue to be provided. In some examples, while initiating display of the virtual display, a first volume level corresponding to the first audio output is lowered, wherein the first volume level is lowered to a first predefined volume level. In some examples, while initiating display of the virtual display, a second volume level corresponding to the second audio output is raised, wherein the second volume level is raised to a second predefined volume level. In some examples, while lowering the first volume level corresponding to the first audio output, a third audio output is applied to the first audio output, wherein the third audio output corresponds to a noise control signal. In some examples, while displaying the virtual display at the fixed boundary location, the first volume level is maintained at the first predefined volume level, and the second volume level is maintained at the second predefined volume level. In some examples, displaying of the virtual display is ceased, and in response to ceasing display of the virtual display, the first volume level corresponding to the first audio output is raised to an original volume level, the second volume level corresponding to the second audio output is lowered, and providing the second audio output is ceased.

In some examples, a first audio output is provided including audio associated with the physical setting, and a second audio output is provided including audio associated with media playing on the virtual display. In some examples, in accordance with detecting an amount of movement of a user gaze away from the virtual display, a first volume level of the first audio output and a second volume level of the second audio output are adjusted based on the amount of movement of the user gaze away from the virtual display. In some examples, in accordance with detecting an amount of movement of a user gaze towards the virtual display, the first volume level of the first audio output and the second volume level of the second audio output are adjusted based on the amount of movement of the user gaze towards the virtual display. In some examples, adjusting a first volume level of the first audio output and a second volume level of the second audio output includes raising the first volume level in proportion to the amount of movement of the user gaze away from the virtual display, and lowering the second volume level in proportion to the amount of movement of the user gaze away from the virtual display. In some examples, adjusting, based on the amount of movement of the user gaze away from the virtual display, a first volume level of the first audio output and a second volume level of the second audio output includes lowering the first volume level in proportion to the amount of movement of the user gaze towards the virtual display, and raising the second volume level in proportion to the amount of movement of the user gaze towards the virtual display.

In some examples, in accordance with detecting movement of a user gaze towards an area proximate to the virtual display, a respective portion of the representation of the physical setting is replaced with a respective portion of the virtual setting, wherein the respective portion of the representation of the physical setting is less than the representation of the physical setting. In some examples, in accordance with detecting movement of the user gaze to the virtual display, the representation of the physical setting is replaced with the virtual setting.

Various processes defined herein consider the option of obtaining and utilizing a user's personal information. For example, such personal information may be utilized in order to display a virtual display in an extended reality setting. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

What is claimed is:

1. An electronic device, comprising:
   one or more processors; and
   memory storing one or more programs configured to be executed by the one or more processors, the one or more programs including instructions for:
      obtaining a set of parameters corresponding to characteristics of a physical setting of a user;
      determining, based on the set of parameters, at least one display placement value and a fixed boundary location corresponding to the physical setting, wherein the display placement value includes a virtual display size; and
      in accordance with a determination that the at least one display placement value satisfies a display placement criterion including a threshold virtual display size, wherein the display placement criterion is satisfied when the virtual display size satisfies the threshold virtual display size:
         displaying a virtual display at the fixed boundary location corresponding to the physical setting.

2. The electronic device of claim 1, the one or more programs further including instructions for:
   in accordance with a determination that the at least one display placement value does not satisfy the display placement criterion:
      displaying the virtual display at a fixed location corresponding to a predefined distance in front of the user in the physical setting.

3. The electronic device of claim 1, the one or more programs further including instructions for:
   detecting a user input corresponding to an intent to adjust the virtual display;
   in accordance with a determination that the intent to adjust the virtual display includes an intent to move the virtual display, displaying movement of the virtual display to an alternative location; and
   in accordance with a determination that the intent to adjust the virtual display includes an intent to modify a size of the virtual display, displaying a size modification of the virtual display.

4. The electronic device of claim 1, the one or more programs further including instructions for:
   in accordance with detecting a virtual space preference:
      identifying at least one boundary corresponding to the physical setting;
      displaying a virtual room;
      wherein the virtual room at least partially replaces a representation of the at least one boundary; and
      wherein the virtual display is displayed within the virtual room.

5. The electronic device of claim 1, the one or more programs further including instructions for:
   in accordance with detecting at least one light parameter exceeding a threshold:
      displaying a virtual sky; and
      wherein the virtual sky at least partially replaces a representation of at least one ceiling boundary corresponding to the physical setting.

6. The electronic device of claim 1, the one or more programs further including instructions for:
   displaying media on the virtual display;
   identifying an attribute associated with the displayed media;
   identifying at least one boundary corresponding to the physical setting; and
   displaying a virtual room based on the identified attribute, wherein the virtual room at least partially replaces a representation of the at least one boundary.

7. The electronic device of claim 1, the one or more programs further including instructions for:
   detecting a user head movement; and
   in accordance with a determination that the user head movement corresponds to movement away from the virtual display, decreasing a curvature of the virtual display.

8. The electronic device of claim 7, the one or more programs further including instructions for:
   in accordance with a determination that the user head movement corresponds to movement towards the virtual display, increasing a curvature of the virtual display.

9. The electronic device of claim 1, the one or more programs further including instructions for:
   identifying audio associated with media displayed on the virtual display;
   receiving, from a media delivery model, a result based on the set of parameters;
   in accordance with a determination that the result includes an audio rendering setting:
      obtaining, from the result, audio output parameters based on the characteristics of the physical setting; and outputting the audio consistent with the audio output parameters; and in accordance with a determination that the result does not include an audio rendering setting;
obtaining default audio output parameters; and
outputting the audio consistent with the default audio output parameters.

10. The electronic device of claim 1, the one or more programs further including instructions for:
in accordance with detecting an amount of movement of a user gaze towards the virtual display:
replacing at least a portion of a representation of the physical setting with a portion of a virtual setting.

11. The electronic device of claim 1, the one or more programs further including instructions for:
while detecting movement of the user gaze towards the virtual display:
gradually replacing, in proportion to the detected movement of the user gaze towards the virtual display, a representation of the physical setting with a virtual setting; and
while detecting the movement of the user gaze away from the virtual display:
gradually replacing, in proportion to the detected movement of the user gaze away from the virtual display, a virtual setting with the representation of physical setting.

12. The electronic device of claim 1, the one or more programs further including instructions for:
providing the set of parameters to a media delivery model; and
receiving, from the media delivery model, a result based on the provided set of parameters, wherein the result includes the at least one display placement value and the fixed boundary location corresponding to the physical setting.

13. The electronic device of claim 1, the one or more programs further including instructions for:
providing a first audio output including audio associated with the physical setting;
while initiating display of the virtual display, providing a second audio output including audio associated with media playing on the virtual display; and
while displaying the virtual display at the fixed boundary location, continuing to provide the first audio output and the second audio output.

14. The electronic device of claim 13, the one or more programs further including instructions for:
while initiating display of the virtual display:
lowering a first volume level corresponding to the first audio output, wherein the first volume level is lowered to a first predefined volume level; and
raising a second volume level corresponding to the second audio output, wherein the second volume level is raised to a second predefined volume level.

15. The electronic device of claim 14, the one or more programs further including instructions for:
while lowering the first volume level corresponding to the first audio output, applying a third audio output to the first audio output, wherein the third audio output corresponds to a noise control signal.

16. The electronic device of claim 1, the one or more programs further including instructions for:
providing a first audio output including audio associated with the physical setting;
providing a second audio output including audio associated with media playing on the virtual display;

in accordance with detecting an amount of movement of a user gaze away from the virtual display:
adjusting, based on the amount of movement of the user gaze away from the virtual display, a first volume level of the first audio output and a second volume level of the second audio output; and
in accordance with detecting an amount of movement of a user gaze towards the virtual display:
adjusting, based on the amount of movement of the user gaze towards from the virtual display, the first volume level of the first audio output and the second volume level of the second audio output.

17. A method, comprising:
at an electronic device:
obtaining a set of parameters corresponding to characteristics of a physical setting of a user;
determining, based on the set of parameters, at least one display placement value and a fixed boundary location corresponding to the physical setting, wherein the display placement value includes a virtual display size; and
in accordance with a determination that the at least one display placement value satisfies a display placement criterion including a threshold virtual display size, wherein the display placement criterion is satisfied when the virtual display size satisfies the threshold virtual display size:
displaying a virtual display at the fixed boundary location corresponding to the physical setting.

18. The method of claim 17, comprising:
in accordance with a determination that the at least one display placement value does not satisfy the display placement criterion:
displaying the virtual display at a fixed location corresponding to a predefined distance in front of the user in the physical setting.

19. The method of claim 17, comprising:
detecting a user input corresponding to an intent to adjust the virtual display;
in accordance with a determination that the intent to adjust the virtual display includes an intent to move the virtual display, displaying movement of the virtual display to an alternative location; and
in accordance with a determination that the intent to adjust the virtual display includes an intent to modify a size of the virtual display, displaying a size modification of the virtual display.

20. The method of claim 17, comprising:
providing a first audio output including audio associated with the physical setting;
while initiating display of the virtual display, providing a second audio output including audio associated with media playing on the virtual display; and
while displaying the virtual display at the fixed boundary location, continuing to provide the first audio output and the second audio output.

21. The method of claim 20, comprising:
while initiating display of the virtual display:
lowering a first volume level corresponding to the first audio output, wherein the first volume level is lowered to a first predefined volume level; and
raising a second volume level corresponding to the second audio output, wherein the second volume level is raised to a second predefined volume level.

22. A non-transitory computer-readable storage medium storing one or more programs configured to be executed by one or more processors of an electronic device, the one or more programs including instructions for:

obtaining a set of parameters corresponding to characteristics of a physical setting of a user;

determining, based on the set of parameters, at least one display placement value and a fixed boundary location corresponding to the physical setting, wherein the display placement value includes a virtual display size; and in accordance with a determination that the at least one display placement value satisfies a display placement criterion including a threshold virtual display size, wherein the display placement criterion is satisfied when the virtual display size satisfies the threshold virtual display size:

displaying a virtual display at the fixed boundary location corresponding to the physical setting.

23. The computer readable medium of claim 22, the one or more programs further including instructions for:

in accordance with a determination that the at least one display placement value does not satisfy the display placement criterion:

displaying the virtual display at a fixed location corresponding to a predefined distance in front of the user in the physical setting.

24. The computer readable medium of claim 22, the one or more programs further including instructions for:

detecting a user input corresponding to an intent to adjust the virtual display;

in accordance with a determination that the intent to adjust the virtual display includes an intent to move the virtual display, displaying movement of the virtual display to an alternative location; and in accordance with a determination that the intent to adjust the virtual display includes an intent to modify a size of the virtual display, displaying a size modification of the virtual display.

25. The computer readable medium of claim 22, the one or more programs further including instructions for:

in accordance with detecting a virtual space preference:

identifying at least one boundary corresponding to the physical setting;

displaying a virtual room;

wherein the virtual room at least partially replaces a representation of the at least one boundary; and wherein the virtual display is displayed within the virtual room.

26. The computer readable medium of claim 22, the one or more programs further including instructions for:

providing a first audio output including audio associated with the physical setting;

while initiating display of the virtual display, providing a second audio output including audio associated with media playing on the virtual display; and while displaying the virtual display at the fixed boundary location, continuing to provide the first audio output and the second audio output.

27. The computer readable medium of claim 22, the one or more programs further including instructions for:

while initiating display of the virtual display:

lowering a first volume level corresponding to the first audio output, wherein the first volume level is lowered to a first predefined volume level; and raising a second volume level corresponding to the second audio output, wherein the second volume level is raised to a second predefined volume level.

\* \* \* \* \*